(12) United States Patent
Zalewski et al.

(10) Patent No.: US 7,352,359 B2
(45) Date of Patent: Apr. 1, 2008

(54) METHOD AND SYSTEM FOR APPLYING GEARING EFFECTS TO INERTIAL TRACKING

(75) Inventors: Gary M. Zalewski, Foster City, CA (US); Richard Marks, Foster City, CA (US); Xiadong Mao, Foster City, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 0 days.

(21) Appl. No.: 11/382,041

(22) Filed: May 7, 2006

(65) Prior Publication Data

US 2006/0252475 A1 Nov. 9, 2006

Related U.S. Application Data

(63) Continuation-in-part of application No. 10/663,236, filed on May 4, 2006, and a continuation-in-part of application No. 11/381,721, filed on May 4, 2006, and a continuation-in-part of application No. 11/381,724, filed on May 4, 2006, and a continuation-in-part of application No. 11/381,727, filed on May 4, 2006, and a continuation-in-part of application No. 11/381,725, filed on May 4, 2006, and a continuation-in-part of application No. 11/381,728, filed on May 4, 2006, and a continuation-in-part of application No. 11/381,729, filed on May 4, 2006, and a continuation-in-part of application No. 11/301,673, filed on Dec. 12, 2005, and a continuation-in-part of application No. 10/820,469, filed on Apr. 7, 2004, and a continuation-in-part of application No. 10/759,782, filed on Jan. 16, 2004, and a continuation-in-part of application No. 10/663,236, filed on Sep. 15, 2003, and a continuation-in-part of application No. 10/650,409, filed on Aug. 27, 2003, and a continuation-in-part of application No. 10/207,677, filed on Jul. 27, 2002, now Pat. No. 7,102,615.

(60) Provisional application No. 60/718,145, filed on Sep. 15, 2005.

(51) Int. Cl.
G09G 5/00 (2006.01)
G06F 19/00 (2006.01)
G06F 3/16 (2006.01)

(52) U.S. Cl. .................... 345/156; 345/161; 345/163; 345/167; 345/168; 463/30; 463/36; 463/37; 715/716; 715/727

(58) Field of Classification Search ................ 345/156, 345/157, 161, 163, 167, 179, 184; 178/18.04, 178/19.02; 381/26, 59, 71.2; 341/33, 46, 341/47; 901/709.1; 463/30, 31, 34–37; 715/716, 727, 728, 702, 848–852; 348/14.05, 348/117, 163
See application file for complete search history.

(56) References Cited

U.S. PATENT DOCUMENTS 5,554,980 A * 9/1996 Hashimoto et al. .... 340/825.72

(Continued)

FOREIGN PATENT DOCUMENTS

| WO | WO 2004/073814 A1 | 2/2004 |
|---|---|---|
| WO | WO 2004/073815 A1 | 2/2004 |

*Primary Examiner*—Henry N Tran
(74) *Attorney, Agent, or Firm*—Martine Penilla & Gencarella, LLP

(57) ABSTRACT

Methods and systems for interactive interfacing with a computer gaming system are provided. A method includes providing an input device, where the input device is configured to convey inertial data that is to be interpreted by the computer gaming system. The method then identifies an action to be performed by the computer gaming system, where the action is mapped to the inertial data provided by the input device. Then, the method applies a gearing between the action to be performed by the computer gaming system and the inertial data received from the input device. The gearing scales an adjustment to impact the action to be performed by the computer gaming system. The gearing can be set dynamically by the game, by the user, or can be preset by software or user configured in accordance with a gearing algorithm.

20 Claims, 11 Drawing Sheets

U.S. PATENT DOCUMENTS

| | | | |
|---|---|---|---|
| 6,022,274 A * | 2/2000 | Takeda et al. | 463/44 |
| 6,400,374 B2 * | 6/2002 | Lanier | 345/630 |
| 6,417,836 B1 * | 7/2002 | Kumar et al. | 345/156 |
| 6,890,262 B2 * | 5/2005 | Oishi et al. | 463/31 |
| 7,042,440 B2 * | 5/2006 | Pryor et al. | 345/158 |

* cited by examiner

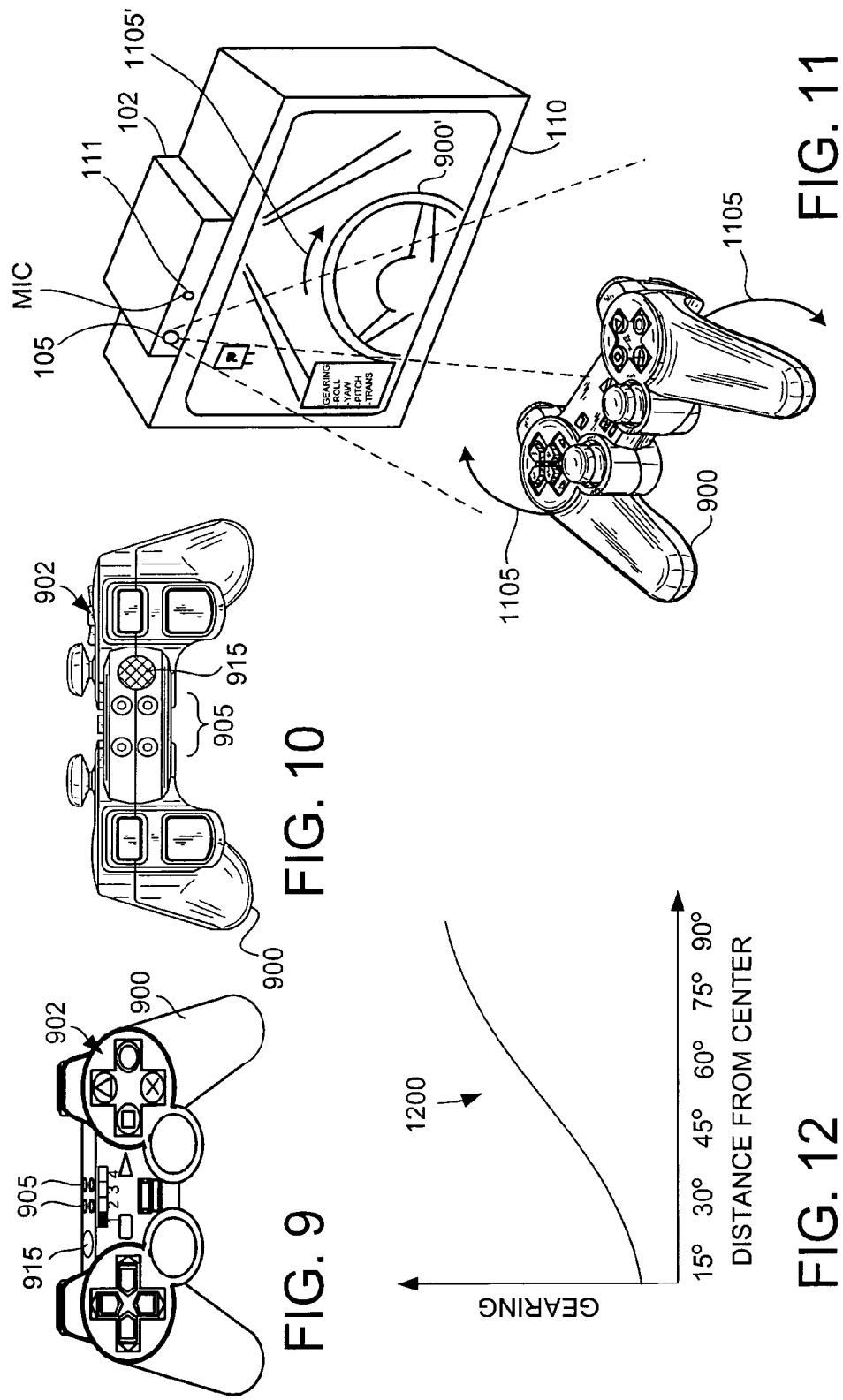

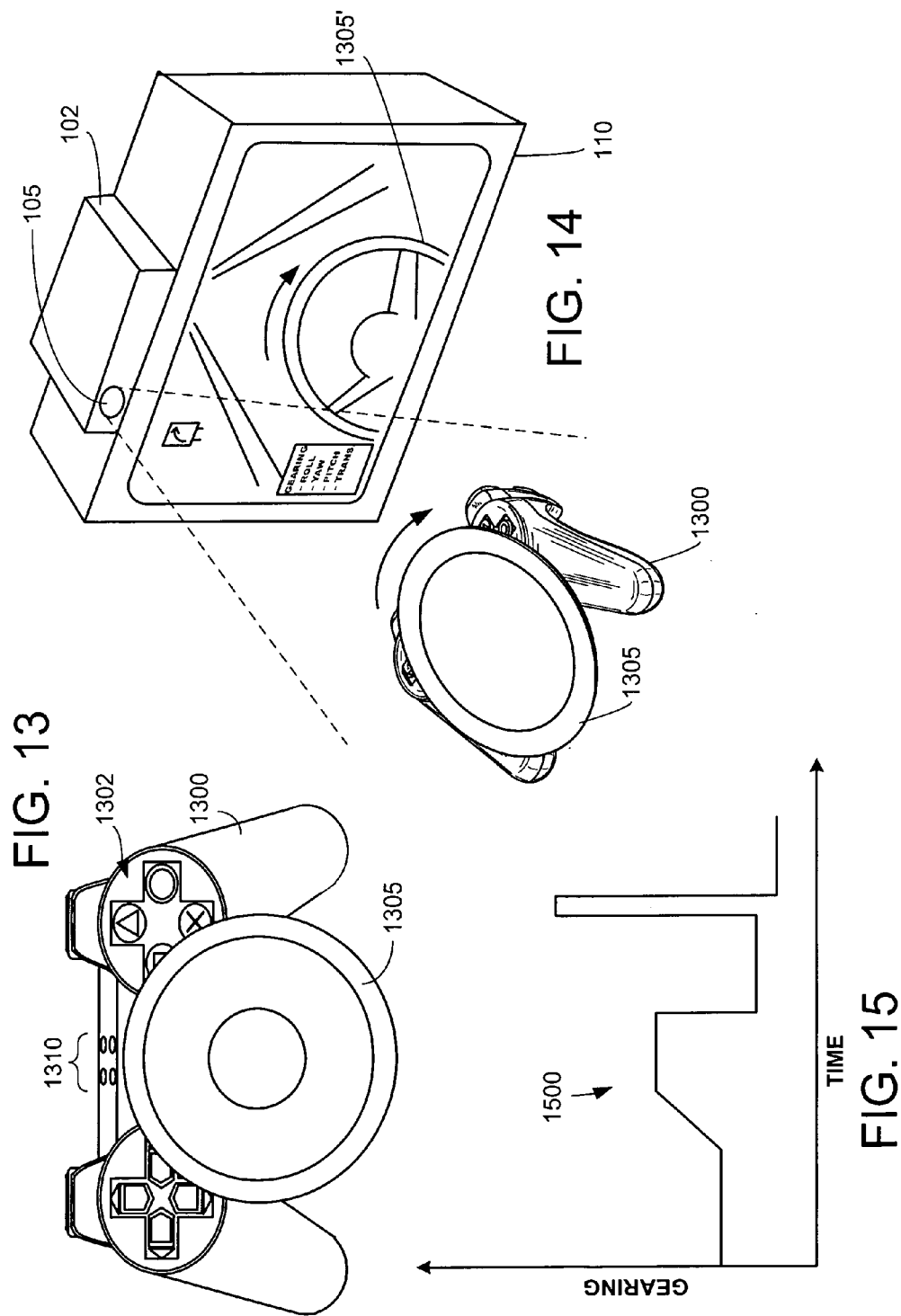

METHOD AND SYSTEM FOR APPLYING GEARING EFFECTS TO INERTIAL TRACKING

CLAIM OF PRIORITY

This application is a continuation in part (CIIP) of U.S. patent application Ser. No. 10/207,677, now U.S. Pat. No. 7,102,615, entitled, "MAN-MACHINE INTERFACE USING A DEFORMABLE DEVICE", filed on Jul. 27, 2002; U.S. patent application Ser. No. 10/650,409, entitled, "AUDIO INPUT SYSTEM", filed on Aug. 27, 2003; U.S. patent application Ser. No. 10/663,236, entitled "METHOD AND APPARATUS FOR ADJUSTING A VIEW OF A SCENE BEING DISPLAYED ACCORDING TO TRACKED HEAD MOTION", filed on Sep. 15, 2003; U.S. patent application Ser. No. 10/759,782, entitled "METHOD AND APPARATUS FOR LIGHT INPUT DEVICE", filed on Jan. 16, 2004; U.S. patent application Ser. No. 10/820,469, entitled "METHOD AND APPARATUS TO DETECT AND REMOVE AUDIO DISTURBANCES", filed on Apr. 7, 2004; and U.S. patent application Ser. No. 11/301,673, entitled "METHOD FOR USING RELATIVE HEAD AND HAND POSITIONS TO ENABLE A POINTING INTERFACE VIA CAMERA TRACKING", filed on Dec. 12, 2005; U.S. patent application Ser. No. 11/381,729, to Xiao Dong Mao, entitled ULTRA SMALL MICROPHONE ARRAY, filed on May 4, 2006, application Ser. No. 11/381,728, to Xiao Dong Mao, entitled ECHO AND NOISE CANCELLATION, filed on May 4, 2006, U.S. patent application Ser. No. 11/381,725, to Xiao Dong Mao, entitled "METHODS AND APPARATUS FOR TARGETED SOUND DETECTION", filed on May 4, 2006, U.S. patent application Ser. No. 11/381,727, to Xiao Dong Mao, entitled "NOISE REMOVAL FOR ELECTRONIC DEVICE WITH FAR FIELD MICROPHONE ON CONSOLE", filed on May 4, 2006, U.S. patent application Ser. No. 11/381,724, to Xiao Dong Mao, entitled "METHODS AND APPARATUS FOR TARGETED SOUND DETECTION AND CHARACTERIZATION", filed on May 4, 2006, U.S. patent application Ser. No. 11/381,721, to Xiao Dong Mao, entitled "SELECTIVE SOUND SOURCE LISTENING IN CONJUNCTION WITH COMPUTER INTERACTIVE PROCESSING", filed on May 4, 2006, all of which are hereby incorporated by reference.

This application claims benefit of U.S. Provisional Patent Application No. 60/718,145, entitled "AUDIO, VIDEO, SIMULATION, AND USER INTERFACE PARADIGMS", filed Sep. 15, 2005, which is hereby incorporated by reference.

CROSS REFERENCE TO RELATED APPLICATIONS

This application is also related to co-pending application Ser. No. 11/418,988 to Xiao Dong Mao, entitled "METHODS AND APPARATUSES FOR ADJUSTING A LISTENING AREA FOR CAPTURING SOUNDS", filed on May 4, 2006, the entire disclosures of which are incorporated herein by reference.

This application is also related to co-pending application Ser. No. 11/418,989, to Xiao Dong Mao, entitled "METHODS AND APPARATUSES FOR CAPTURING AN AUDIO SIGNAL BASED ON VISUAL IMAGE", filed on May 4, 2006, the entire disclosures of which are incorporated herein by reference.

This application is also related to co-pending application Ser. No. 11/429,047, to Xiao Dong Mao, entitled "METHODS AND APPARATUSES FOR CAPTURING AN AUDIO SIGNAL BASED ON A LOCATION OF THE SIGNAL", filed on May 4, 2006, the entire disclosures of which are incorporated herein by reference.

This application is also related to co-pending application Ser. No. 11/429,133, to Richard Marks et al., entitled "SELECTIVE SOUND SOURCE LISTENING IN CONJUNCTION WITH COMPUTER INTERACTIVE PROCESSING", filed on May 4, 2006, the entire disclosures of which are incorporated herein by reference.

This application is also related to co-pending application Ser. No. 11/429,414, to Richard Marks et al., entitled "Computer Image and Audio Processing of Intensity and Input Devices for Interfacing With A Computer Program", filed on May 4, 2006, the entire disclosures of which are incorporated herein by reference.

This application is also related to co-pending application Ser. No. 11/382,031, entitled "MULTI-INPUT GAME CONTROL MIXER", filed on the same day as this application, the entire disclosures of which are incorporated herein by reference.

This application is also related to co-pending application Ser. No. 11/382,032, entitled "SYSTEM FOR TRACKING USER MANIPULATIONS WITHIN AN ENVIRONMENT", filed on the same day as this application, the entire disclosures of which are incorporated herein by reference.

This application is also related to co-pending application Ser. No. 11/382,033, entitled "SYSTEM, METHOD, AND APPARATUS FOR THREE-DIMENSIONAL INPUT CONTROL", filed on the same day as this application, the entire disclosures of which are incorporated herein by reference.

This application is also related to co-pending application Ser. No. 11/382,035, entitled "INERTIALLY TRACKABLE HAND-HELD CONTROLLER", filed on the same day as this application, the entire disclosures of which are incorporated herein by reference.

This application is also related to co-pending application Ser. No. 11/382,036, entitled "METHOD AND SYSTEM FOR APPLYING GEARING EFFECTS TO VISUAL TRACKING", filed on the same day as this application, the entire disclosures of which are incorporated herein by reference.

This application is also related to co-pending application Ser. No. 11/382,038, entitled "METHOD AND SYSTEM FOR APPLYING GEARING EFFECTS TO ACOUSTICAL TRACKING", filed on the same day as this application, the entire disclosures of which are incorporated herein by reference.

This application is also related to co-pending application Ser. No. 11/382,040, entitled "METHOD AND SYSTEM FOR APPLYING GEARING EFFECTS TO MULTI-CHANNEL MIXED INPUT", filed on the same day as this application, the entire disclosures of which are incorporated herein by reference.

This application is also related to co-pending application Ser. No. 11/382,034, entitled "SCHEME FOR DETECTING AND TRACKING USER MANIPULATION OF A GAME CONTROLLER BODY", filed on the same day as this application, the entire disclosures of which are incorporated herein by reference.

This application is also related to co-pending application Ser. No. 11/382,037, entitled "SCHEME FOR TRANSLATING MOVEMENTS OF A HAND-HELD CONTROLLER INTO INPUTS FOR A SYSTEM", filed on the same day as this application, the entire disclosures of which are incorporated herein by reference.

This application is also related to co-pending application Ser. No. 11/382,043, entitled "DETECTABLE AND TRACKABLE HAND-HELD CONTROLLER", filed on the same day as this application, the entire disclosures of which are incorporated herein by reference.

This application is also related to co-pending application Ser. No. 11/382,039, entitled "METHOD FOR MAPPING MOVEMENTS OF A HAND-HELD CONTROLLER TO GAME COMMANDS", filed on the same day as this application, the entire disclosures of which are incorporated herein by reference.

This application is also related to co-pending application Ser. No. 29/259,349, entitled "CONTROLLER WITH INFRARED PORT ((DESIGN PATENT))", filed on the same day as this application, the entire disclosures of which are incorporated herein by reference.

This application is also related to co-pending application Ser. No. 29/259,350, entitled "CONTROLLER WITH TRACKING SENSORS ((DESIGN PATENT))", filed on the same day as this application, the entire disclosures of which are incorporated herein by reference.

This application is also related to co-pending application Ser. No. 60/798,031, entitled "DYNAMIC TARGET INTERFACE", filed on the same day as this application, the entire disclosures of which are incorporated herein by reference.

This application is also related to co-pending application Ser. No. 29/259,348, entitled "TRACKED CONTROLLER DEVICE ((DESIGN))", filed on the same day as this application, the entire disclosures of which are incorporated herein by reference.

BACKGROUND

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms include the Sony Playstation or Sony Playstation2 (PS2), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, wherein a user can interactively play against or with other users over the Internet.

As game complexity continues to intrigue players, gaming software and hardware manufacturers have continued to innovate to enable additional interactivity. In reality, however, the way in which users interact with a game has not changed dramatically over the years. Commonly, users still play computer games using hand held controllers or interact with programs using mouse pointing devices.

In view of the foregoing, there is a need for methods and systems that enable more advanced user interactivity with game play.

SUMMARY

Broadly speaking, the present invention fills these needs by providing methods, systems and apparatus that enable dynamic user interactivity with a computing system. In one embodiment, the computing system will be executing a program and the interactivity will be with the program. The program may be, for example, a video game that defines interactive objects or features. The interactivity includes providing users with an ability to adjust a gearing component that will adjust a degree by which processing is performed.

In one embodiment, gearing can be applied to relative movement between movement of an input device verses an amount of movement processed by an object or feature of a computer program.

In another embodiment, gearing can be applied to a feature of a computer program, and detection from an input device can be based from processing of an inertial analyzer. The inertial analyzer will track an input device for inertial activity, and the inertial analyzer can then convey the information to a program. The program will then take the output from the inertial analyzer so that a gearing amount can be applied to the output. The gearing amount will then dictate a degree or ratio by which a program will compute an operation. The operation can take on any number of forms, and one example of the operation can be to generate a noise, a variable nose, a movement by an object, or a variable. If the output is a variable, the variable (e.g., a multiplier or the like) may be used to complete the execution of a process, such that the process will take into account the amount of gearing. The amount of gearing can be preset, set dynamically by the user or adjusted on demand.

In one embodiment, the tracking can be by way of an acoustic analyzer. The acoustic analyzer is configured to receive acoustic signals from an input device, and the acoustic analyzer can convey a gearing amount to be applied to the command or interaction being performed. The acoustic analyzer can be in the form of a computer program segment(s) or specifically defined on a circuit that is designed to process acoustic signal information. The acoustic signal information can therefore include gearing data that may be dynamically set by a program, set on-demand by the user through the input device (e.g., by selecting a button on a controller, a voice command, or the like).

In one embodiment, the tracking of the input device may by through an image analyzer. The image analyzer, as will be discussed below, can include a camera that captures images of a space where a user and an input device are located. In this example, the image analyzer is determining position of the controller to cause some respective action to a feature of a processing program. The program may be a game, and the feature may be an object that is being controlled by the input device. The image analyzer is further configured to mix the position data with an input gearing value. The gearing value can be provided by the user dynamically during execution or can be set by a program depending on activity within an execution session. The gearing input will set a relative impact on some processing by the computer program based on an input gesture or action by the user. In one embodiment, the gearing will translate a command or action from a user or user input device to a feature of a program. The feature of the program need not be an object that is visible, but can also include the adjustment of a variable used to calculate some parameter, estimation or translation of either sound, vibration or image movement. Gearing will therefore provide an additional sense of control to the interactivity provided to and with a program and features of the program.

In still another embodiment, mixer analyzer is provided. The Mixer analyzer is designed to generate a hybrid effect to a feature of the game. For instance, the Mixer analyzer can take input from a combination of the image analyzer, the acoustic analyzer, the inertial analyzer, and the like. The Mixer analyzer can therefore, in one embodiment, receive several gearing variables, which can then be mixed and synthesized to generate a hybrid result, command or interaction with a feature of a program. Again, the feature of the program should be broadly understood to include visual and non-visual objects, variables used in the processing of an operation, adjustments to audible reactions, and the like.

In one specific example, the amount by which movement by a user's controller will translate to movement or action on a feature of a game will be at least partially related to the set or determined gearing. The gearing can be dynamically set, preset for the game or adjusted during game play by the user, and the response is mapped to the video game object or feature to provide for another level of user interactivity and an enhanced experience.

It should be appreciated that the present invention can be implemented in numerous ways, including as a process, an apparatus, a system, a device, or a method. Several inventive embodiments of the present invention are described below.

In one embodiment, methods and systems for interactive interfacing with a computer gaming system are provided. A method includes providing an input device, where the input device is configured to convey inertial data that is to be interpreted by the computer gaming system. The method then identifies an action to be performed by the computer gaming system, where the action is mapped to the inertial data provided by the input device. Then, the method applies a gearing between the action to be performed by the computer gaming system and the inertial data received from the input device. The gearing scales an adjustment to impact the action to be performed by the computer gaming system. The gearing can be set dynamically by the game, by the user, or can be preset by software or user configured in accordance with a gearing algorithm.

In another embodiment, a method for interactive interfacing with a computer gaming system is disclosed. The computer gaming system includes a video capture device for capturing image data. The method includes displaying an input device to the video capture device, such that the input device conveying positioning of the input device and communication data that is to be interpreted by the computer gaming system based on analysis of the captured image data. The method then defines movement of an object of a computer game that is to be executed by the computer gaming system, and the movement of the object may be mapped to movements in position of the input device as detected in the captured image data. The method then establishes a gearing between the movement of the object of the computer game verses the movements in position of the input device. The gearing establishes a user adjustable ratio between movements in position of the input device and movements of the object.

In yet another embodiment, computer readable media including program instructions for interactive interfacing with a computer gaming system is provided. The computer gaming system includes a video capture device for capturing image data. The computer readable media includes program instructions for detecting the display of an input device to the video capture device, the input device conveying positioning of the input device and communication data that is to be interpreted by the computer gaming system based on analysis of the captured image data. The computer readable media further includes program instruction for defining movement of an object of a computer game that is to be executed by the computer gaming system, where the movement of the object is mapped to movements in position of the input device as detected in the captured image data. The computer readable media also includes program instructions for establishing a gearing between the movement of the object of the computer game verses the movements in position of the input device, where the gearing may be configured to establish a user adjustable ratio between movements in position of the input device and movements of the object. The user adjustable ratio capable of being dynamically changed during game play, before a game play session or during certain action events during a game.

In still another embodiment, a system for enabling dynamic user interactivity between user actions and actions to be performed by an object of a computer program is provided. The system includes a computing system, a video capture device coupled to the computing system, a display, and the display receives input from the computing system. The system further includes an input device for interfacing with the computer program that is to be executed by the computing system. The input device having a gearing control for establishing a ratio between movement of the input device as mapped to movement of an object being controlled. The object being defined by the computer program and executed by the computing system. The movement of the input device being identified by the video capture device and the movement of the object as illustrated on the display having a set gearing value as set by the gearing control of the input device. In this embodiment, the gearing associated with the input device may be applied to a general application, and does not necessarily have to be for a game.

In another embodiment, an apparatus for enabling dynamic user interactivity between user actions and actions to be performed by an object of a computer program is provided. The apparatus includes an input device for interfacing with the computer program that is to be executed by a computing system. The input device has a gearing control for establishing a ratio between movement of the input device as mapped to movement of an object being controlled. The object being defined by the computer program and executed by the computing system, and the movement of the input device is identified by a video capture device and the movement of the object is illustrated on a display having a set gearing value as set by the gearing control of the input device.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIGS. 9 and 10 show plan and rear elevation views, respectively, of an exemplary controller that interacts with an image capture device.

FIG. 11 shows an exemplary application for the controller of FIGS. 9 and 10.

FIG. 12 shows an exemplary software controlled gearing amount for the application shown in FIG. 11.

FIG. 13 shows an exemplary controller having a steering wheel.

FIG. 14 shows an exemplary application for the controller of FIG. 13.

FIG. 15 shows an exemplary graph depicting exemplary changes in gearing amount over time.

DETAILED DESCRIPTION

Figure 1:
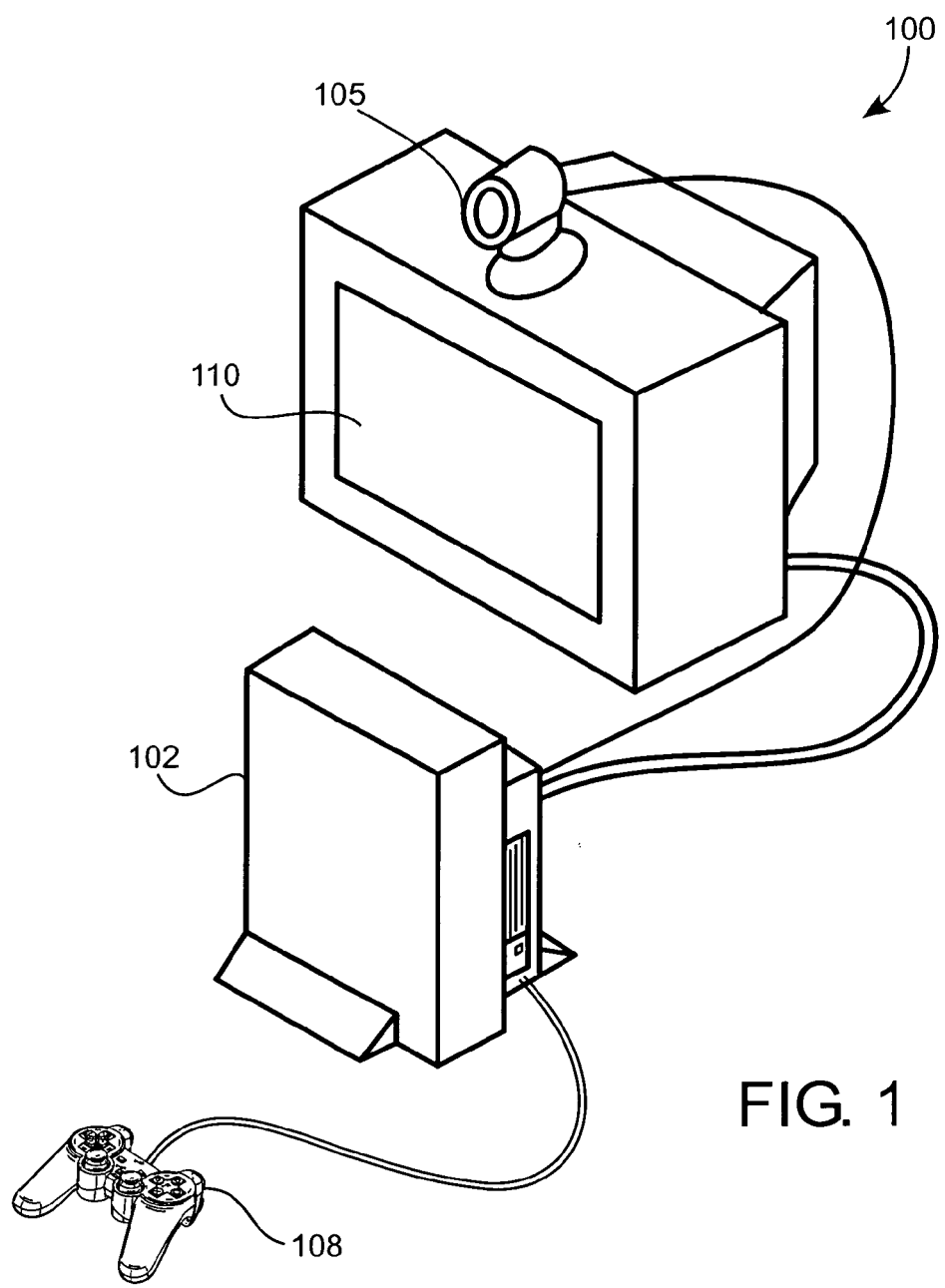
FIG. 1 illustrates an interactive game setup having an image capture device.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to obscure the present invention.

The technology described herein can be used to provide actively geared inputs for an interaction with a computer program. Gearing, in the general and broadest sense, can be defined an input that can have varying degrees in magnitude and/or time. The degree of gearing can then be communicated to a computing system. The degree of gearing may be applied to a process executed by the computing system. By analogy, a process can be imaged as a bucket of fluid having an input and an output. The bucket of fluid is a process that is executing on a system, and the gearing therefore controls an aspect of the processing performed by the computing system. In one example, the gearing can control the rate at which the fluid is emptied from the fluid bucket relative to an input amount, which might be thought of as drops of fluid going into the bucket. Thus, the fill rate may be dynamic, the drain rate may be dynamic, and the drain rate might be impacted by the gearing. The gearing can thus be adjusted or timed so as to tune a changing value that may be streaming to a program, such as a game program. The gearing may also impact a counter, such as a moving data counter that then controls an action by a processor or eventually a game element, object, player, character, etc.

Taking this analogy to a more tangible computing example, the rate at which the fluid is emptied might be the rate at which control is passed to or executed by a feature of a computer program, in response to some input plus gearing. The feature of the computer program may be an object, a process, a variable, or predefined/custom algorithm, character, game player, mouse (2D or 3D), etc. The result of the processing, which may have been altered by the gearing, can be conveyed to an observer in any number of ways. One way may be visually on a display screen, audibly via sound, vibration acoustics via feel, a combination thereof, etc., or simply by the modified response of processing for an interactive element of a game or program.

The input can be obtained by tracking performed via: (1) a image analysis, (2) an inertial analysis, (3) acoustic analysis, or hybrid Mixed analysis of (1), (2) or (3). Various examples are provided regarding image analysis and applied gearing, but it should be understood that the tracking is not limited to video, but can accomplished by numerous ways, and in particular, by inertial analysis, acoustic analysis, mixtures of these and other suitable analyzers.

In various embodiments, a computer or gaming system having a video camera (e.g., image analysis) can process image data and identify various actions taking place in a zone of focus or given volume that may be in front of the video camera. Such actions typically include moving or rotating the object in three dimensional space or actuating any of a variety of controls such as buttons, dials, joysticks, etc. In addition to these techniques, the present technology further provides the additional functionality of adjusting a scaling factor, referred to herein as gearing, to adjust the sensitivity of the input with respect to one or more corresponding actions on a display screen or a feature of a program. For instance, the actions on the display screen may be of an object that may be the focus of a video game. The object may also be a feature of a program, such as a variable, a multiplier, or a computation that will then be rendered as sound, vibration, images on a display screen or a combination of the these and other representations of the geared output.

In another embodiment, gearing can be applied to a feature of a computer program, and detection of an input device can be based on processing by an inertial analyzer. The inertial analyzer will track an input device for inertial activity, and the inertial analyzer can then convey the information to a program. The program will then take the output from the inertial analyzer so that a gearing amount can be applied to the output. The gearing amount will then dictate a degree or ratio by which a program will compute an operation. The operation can take on any number of forms, and one example of the operation can be to generate a noise, a variable nose, vibration, a movement by an object, or computation by a program that then outputs a visible and/or audible result. If the output is a variable, the variable may be used to complete the execution of a process, such that the process will take into account the amount of gearing. The amount of gearing can be preset, set dynamically by the user or adjusted on demand.

Various types of inertial sensor devices may be used to provide information on 6-degrees of freedom (e.g., X, Y and Z translation (e.g., acceleration) and rotation about X, Y and Z axes). Examples of suitable inertial sensors for providing information on 6-degrees of freedom include accelerometers, one or more single axis accelerometers, mechanical gyroscopes, ring laser gyroscopes or combinations of two or more of these.

Signals from the sensor(s) may be analyzed to determine the motion and/or orientation of the controller during play of a video game according to an inventive method. Such a method may be implemented as a series of processor executable program code instructions stored in a processor readable medium and executed on a digital processor. For example, a video game system may include one or more processors. Each processor may be any suitable digital processor unit, e.g., a microprocessor of a type commonly used in video game consoles or custom designed multi-processor cores. In one embodiment, the processor may implement an inertial analyzer through execution of processor readable instructions. A portion of the instructions may be stored in a memory. Alternatively, the inertial analyzer may be implemented in hardware, e.g., as an application specific integrated circuit (ASIC) or digital signal processor (DSP). Such analyzer hardware may be located on the controller or on the console or may be remotely located elsewhere. In hardware implementations, the analyzer may be programmable in response to external signals e.g., from the processor or some other remotely located source, e.g., connected by USB cable, Ethernet, over a network, the Internet, short range wireless connection, broadband wireless, Bluetooth, or a local network.

The inertial analyzer may include or implement instructions that analyze the signals generated by the inertial sensors and utilize information regarding position and/or orientation of a controller. The inertial sensor signals may be analyzed to determine information regarding the position and/or orientation of the controller. The position and or orientation information may be utilized during play of a video game with the system.

In one embodiment, a game controller may include one or more inertial sensors, which may provide position and/or orientation information to a processor via an inertial signal. Orientation information may include angular information such as a tilt, roll or yaw of the controller. As noted above, and by way of example, the inertial sensors may include any number and/or combination of accelerometers, gyroscopes or tilt sensors. In a one embodiment, the inertial sensors include tilt sensors adapted to sense orientation of the joystick controller with respect to tilt and roll axes, a first accelerometer adapted to sense acceleration along a yaw axis and a second accelerometer adapted to sense angular acceleration with respect to the yaw axis. An accelerometer may be implemented, e.g., as a MEMS device including a mass mounted by one or more springs with sensors for sensing displacement of the mass relative to one or more directions. Signals from the sensors that are dependent on the displacement of the mass may be used to determine an acceleration of the joystick controller. Such techniques may be implemented by instructions from the game program or general program, which may be stored in memory and executed by a processor.

By way of example, an accelerometer suitable as an inertial sensor may be a simple mass elastically coupled at three or four points to a frame, e.g., by springs. Pitch and roll axes lie in a plane that intersects the frame, which is mounted to the joystick controller. As the frame (and the joystick controller) rotates about pitch and roll axes the mass will displace under the influence of gravity and the springs will elongate or compress in a way that depends on the angle of pitch and/or roll. The displacement and of the mass can be sensed and converted to a signal that is dependent on the amount of pitch and/or roll. Angular acceleration about the yaw axis or linear acceleration along the yaw axis may also produce characteristic patterns of compression and/or elongation of the springs or motion of the mass that can be sensed and converted to signals that are dependent on the amount of angular or linear acceleration. Such an accelerometer device can measure tilt, roll angular acceleration about the yaw axis and linear acceleration along the yaw axis by tracking movement of the mass or compression and expansion forces of the springs. There are a number of different ways to track the position of the mass and/or or the forces exerted on it, including resistive strain gauge material, photonic sensors, magnetic sensors, hall-effect devices, piezoelectric devices, capacitive sensors, and the like.

In addition, light sources may provide telemetry signals to the processor, e.g., in pulse code, amplitude modulation or frequency modulation format. Such telemetry signals may indicate which buttons are being pressed and/or how hard such buttons are being pressed. Telemetry signals may be encoded into the optical signal, e.g., by pulse coding, pulse width modulation, frequency modulation or light intensity (amplitude) modulation. The processor may decode the telemetry signal from the optical signal and execute a game command in response to the decoded telemetry signal. Telemetry signals may be decoded from analysis of images of the joystick controller obtained by an image capture unit. Alternatively, an apparatus may include a separate optical sensor dedicated to receiving telemetry signals from the lights sources.

A processor may use inertial signals from the inertial sensor in conjunction with optical signals from light sources detected by an image capture unit and/or sound source location and characterization information from acoustic signals detected by a microphone array to deduce information on the location and/or orientation of a controller and/or its user. For example, "acoustic radar" sound source location and characterization may be used in conjunction with a microphone array to track a moving voice while motion of the joystick controller is independently tracked (through inertial sensors and or light sources). In acoustic radar, a pre-calibrated listening zone is selected at runtime and sounds originating from sources outside the pre-calibrated listening zone are filtered out. The pre-calibrated listening zones may include a listening zone that corresponds to a volume of focus or field of view of the image capture unit.

In one embodiment, the tracking can be by way of an acoustic analyzer. The acoustic analyzer is configured to receive acoustic signals from an input device, and the acoustic analyzer can convey a gearing amount to be applied to the command or interaction being performed. The acoustic analyzer can be in the form of a computer program segment(s) or specifically defined on a circuit that is designed to process acoustic signal information. The acoustic signal information can therefore include gearing data that may be dynamically set by a program, set on-demand by the user through the input device (e.g., by selecting a button on a controller, a voice command, or the like). An example acoustic analyzer is described in US Patent Application, filed May 4, 2006 entitled "SELECTIVE SOUND SOURCE LISTENING IN CONJUNCTION WITH COMPUTER INTERACTIVE PROCESSING", by inventors Xiadong Mao, Richard L. Marks and Gary, M. Zalewski, and identified by Attorney Docket No. SCEA04005JUMBOUS, the entire disclosure of which is hereby incorporated herein by reference.

The Analyzers can be configured with a mapping chain. Mapping chains can be swapped out by the game during game-play as can settings to the Analyzer and to the Mixer.

In one embodiment, the tracking of the input device may by through an image analyzer. The image analyzer, as will be discussed further below, can include a camera that captures images of a space where a user and an input device are located. In this example, the image analyzer is determining position of the controller to cause some respective action to a feature of a processing program. The program may be a game, and the feature may be an object that is being controlled by the input device. The image analyzer is further configured to mix the position data with an input gearing value. The gearing value can be provided by the user dynamically during execution or can be set by a program depending on activity within an execution session. The gearing input will set a relative impact on some processing by the computer program based on an input gesture or action by the user. In one embodiment, the gearing will translate a command or action from a user or user input device to a feature of a program. The feature of the program need not be an object that is visible, but can also include the adjustment of a variable used to calculate some parameter, estimation or translation of either sound, vibration or image movement. Gearing will therefore provide an additional sense of control to the interactivity provided to and with a program and features of the program.

In still another embodiment, a mixer analyzer is provided. The Mixer analyzer is designed to generate a hybrid effect to a feature of the game. For instance, the Mixer analyzer can take input from a combination of the image analyzer, the acoustic analyzer, the inertial analyzer, and the like. The Mixer analyzer can therefore, in one embodiment, receive several gearing variables, which can then be mixed and synthesized to generate a hybrid result, command or interaction with a feature of a program. Again, the feature of the program should be broadly understood to include visual and non-visual objects, variables used in the processing of an operation, adjustments to audible reactions, and the like.

FIG. 1 illustrates an interactive game setup 100, in accordance with one embodiment of the present invention. The interactive game setup 100 includes a computer 102, also referred to herein as "console," that is coupled to a display screen 110. An image capture device 105 may be placed on top of the display screen 110 and is coupled to the computer 102. Computer 102 is, in one embodiment, a gaming system console which allows users to play video games and interface with the video games through controllers 108. The computer 102 may also be connected to the internet, to allow for interactive on-line gaming. The image capture device 105 is shown placed on top of the display screen 110, but it should be understood that the image capture device 105 can be placed in any other proximate location that will allow it to capture images that are located about in front of the display screen 110. Techniques for capturing these movements and interactions can vary, but exemplary techniques are described in United Kingdom Applications GB 0304024.3 (PCT/GB2004/000693) and GB 0304022.7 (PCT/GB2004/000703), each filed on Feb. 21, 2003, and each of which is hereby incorporated by reference.

In one embodiment, image capture device 105 can be as simple as a standard web cam or can include more advanced technology. Image capture device 105 may be capable of capturing images, digitizing the images, and communicating the image data back to the computer 102. In some embodiments, the image capture device will have logic integrated therein for performing the digitizing and another embodiment the image capture device 105 will simply transmit an analog video signal to the computer 102 for digitizing. In either case, the image capture device 105 is capable of capturing either color or black and white images of any object located in front of the image capture device 105.

Figure 2:
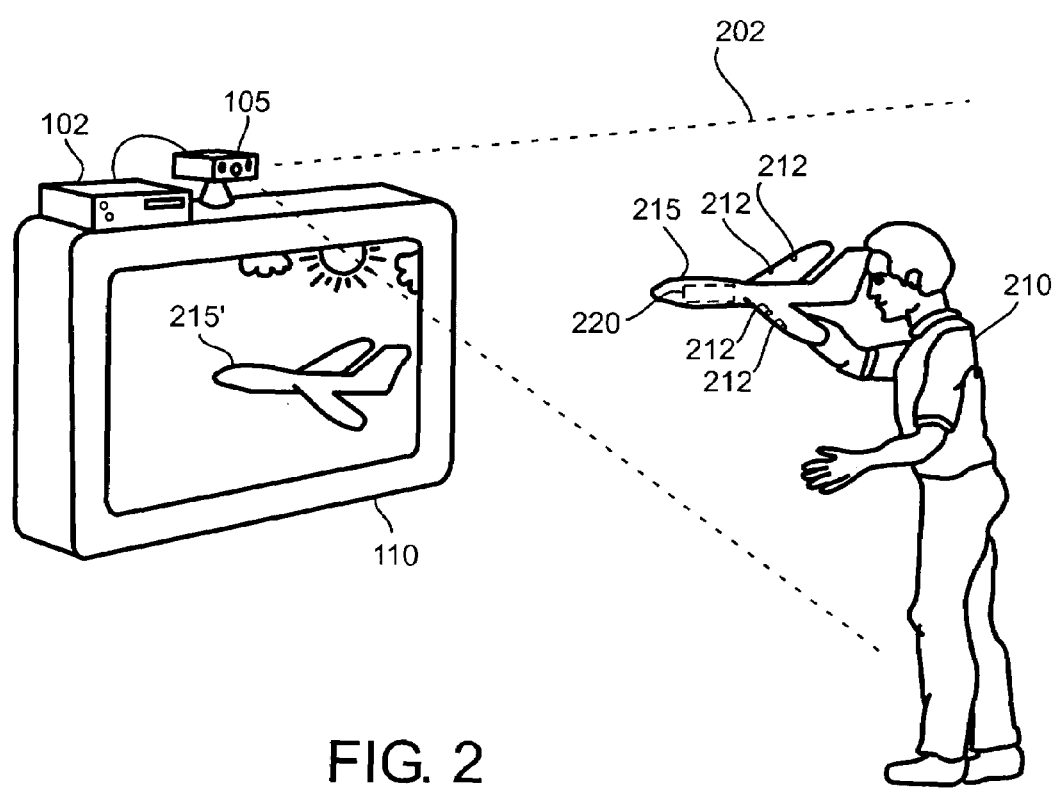
FIG. 2 shows an exemplary computer interaction using a video processing system.

FIG. 2 illustrates an exemplary computer interaction using an image capture and processing system. Computer 102 receives image data from image capture device 105 which generates images from view 202. View 202 includes a user 210 manipulating an object 215 in the shape of a toy airplane. Object 215 includes a plurality of LEDs 212 which are viewable by image capture device 105. LEDs 212 provide location and orientation information of object 215. In addition, object 215 may include one or more actuating elements, such as a button, trigger, dial, etc., for generating computer input. Voice commands may also be used. In one embodiment, object 215 includes a circuit 220 containing logic for modulating LEDs 212 for transmitting data to computer 102 via image capture device 105. The data may include encoded commands generated in response to manipulations of the actuating means. As object 215 is moved and rotated in three dimensional space viewable by image capture device 105, LED positions as represented in image data are translated as described hereinafter with reference to FIGS. 3-6 to coordinates within the three-dimensional space, the coordinates describing both position information in terms of x, y, and z coordinates, as well as orientation information, in terms of $\alpha$, $\beta$, and $\gamma$ values. The coordinates are forwarded to a computer application which may be an airplane game in which the toy airplane is represented on display 110 as a real or animated airplane 215' which may be performing various stunts in response to manipulation of toy airplane 215. Alternatively, instead of the toy airplane 215, the user 210 may be handling a controller 108 (shown in FIG. 1) and movement of the controller 108 can be tracked and commands captured to cause the movement of an object on the display screen.

In one embodiment, the user 210 may also select to change or modify the degree of interactivity with the animated airplane 215'. The degree of interactivity may be modified by allowing the user 215 to adjust a "gearing" component that will adjust an amount by which movement by the user's controller 108 (or toy airplane 215) will be mapped to movement by the animated airplane 215'. Depending on the gearing, which can be dynamically set, preset for the game or adjusted during game play by the user 210, the response mapped to the animated airplane 215' (e.g., video game object) will change to provide for another level of user interactivity and an enhanced experience. Further details regarding the gearing will be provided below with reference to FIGS. 7-20.

Figure 3:
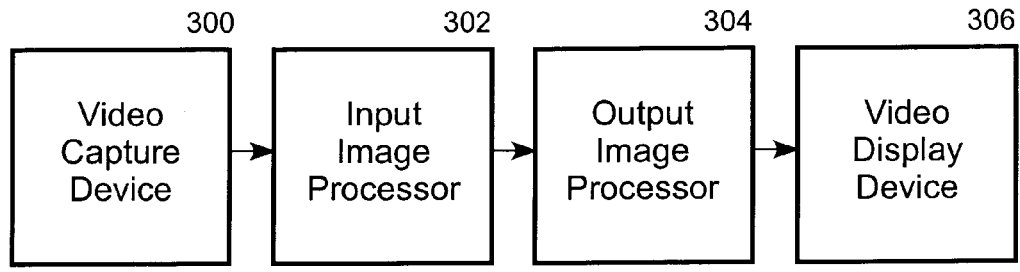
FIG. 3 is a block diagram of an exemplary user input system for interaction with an object on a graphical display.

FIG. 3 is a block diagram of an exemplary user input system for interaction with an object on a graphical display that can be used to implement embodiments of the present invention. As shown in FIG. 3, the user input system is comprised of a video capture device 300, an input image processor 302, an output image processor 304, and a video display device 306. Video capture device 300 may be any device capable of capturing sequences of video images, and, in one embodiment, is a digital video camera (such as a "web-cam"), or similar image capturing device.

The video capture device 300 may be configured to provide depth image. In the this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Camera 300 can therefore provide the ability to capture and map the third-dimension in addition to normal two-dimensional video imagery. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor. However, unlike a conventional camera, a depth camera also captures the z-components of the scene, which represent the depth values for the scene. Since the depth values are typically assigned to the z-axis, the depth values are often referred to as z-values.

In operation, a z-value is captured for each pixel of the scene. Each z-value represents a distance from the camera to a particular object in the scene corresponding to the related pixel. In addition, a maximum detection range is defined beyond which depth values will not be detected. This maximum range plane can be utilized by the embodiments of the present invention to provide user defined object tracking. Thus, using a depth camera, each object can be tracked in three dimensions. As a result, a computer system of the embodiments of the present invention can utilize the z-values, along with the two-dimensional pixel data, to create an enhanced three-dimensional interactive environment for the user. For more information on depth analysis, reference may be made to U.S. patent application Ser. No. 10/448,614, entitled System and Method for Providing a Real-time three dimensional interactive environment, having a filing date of May 29, 2003, which is incorporated herein by reference.

Although a depth camera may be used in accordance with one embodiment, it should not be construed as being necessary to identify a location of position and coordinates of an object in three dimensional space. For example, in the scenario depicted in FIG. 2, the distance between object 215 and camera 105 can be inferred by measuring the distance of left most and right most LEDs 212. The closer together LEDs 212 show up on an image generated by image capture device 105, the farther away object 215 will be from camera 105. Thus, a reasonably accurate inference of z-axis coordinates can be made from two dimensional images generated by a typical digital camera.

Returning to FIG. 3, input image processor 302 translates the captured video images (which may be depth images) of the control object into signals that are delivered to an output image processor. In one embodiment, input image processor 302 is programmed to isolate the control object from the background in the captured video image through the depth information and generate an output signal responsive to the position and/or movement of the control object. The output image processor 304 is programmed to effect translational and/or rotational movement of an object on the video display device 306 in response to signals received from the input image processor 302.

These and additional aspects of the present invention may be implemented by one or more processors which execute software instructions. According to one embodiment of the present invention, a single processor executes both input image processing and output image processing. However, as shown in the figures and for ease of description, the processing operations are shown as being divided between an input image processor 302 and an output image processor 304. It should be noted that the invention is in no way to be interpreted as limited to any special processor configuration, such as more than one processor. The multiple processing blocks shown in FIG. 3 are shown only for convenience of description.

Figure 4:
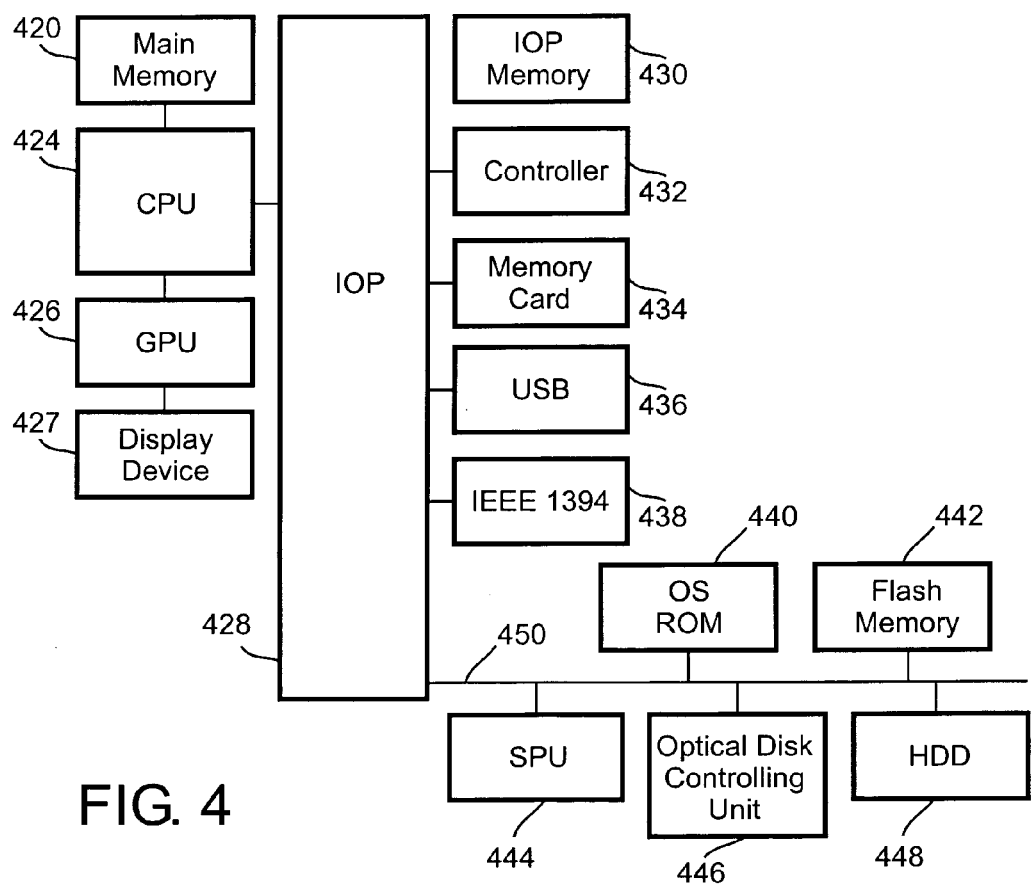
FIG. 4 is a simplified block diagram of a computer processing system configured to implement the embodiments of the invention described herein.

FIG. 4 is a simplified block diagram of a computer processing system configured to implement the embodiments of the invention described herein. The processing system may represent a computer-based entertainment system embodiment that includes central processing unit ("CPU") 424 coupled to main memory 420 and graphical processing unit ("GPU") 426. CPU 424 is also coupled to Input/Output Processor ("IOP") Bus 428. In one embodiment, GPU 426 includes an internal buffer for fast processing of pixel based graphical data. Additionally, GPU 426 can include an output processing portion or functionality to convert the image data processed into standard television signals, for example NTSC or PAL, for transmission to display device 427 connected external to the entertainment system or elements thereof. Alternatively, data output signals can be provided to a display device other than a television monitor, such as a computer monitor, LCD (Liquid Crystal Display) device, or other type of display device.

IOP bus 428 couples CPU 424 to various input/output devices and other busses or device. IOP bus 428 is connected to input/output processor memory 430, controller 432, memory card 434, Universal Serial Bus (USB) port 436, IEEE1394 (also known as a Firewire interface) port 438, and bus 450. Bus 450 couples several other system components to CPU 424, including operating system ("OS") ROM 440, flash memory 442, sound processing unit ("SPU") 444, optical disc controlling 4, and hard disk drive ("HDD") 448. In one aspect of this embodiment, the video capture device can be directly connected to IOP bus 428 for transmission therethrough to CPU 424; where, data from the video capture device can be used to change or update the values used to generate the graphics images in GPU 426. Moreover, embodiments of the present invention can use a variety of image processing configurations and techniques, such as those described in U.S. patent application Ser. No. 10/365,120 filed Feb. 11, 2003, and entitled METHOD AND APPARATUS FOR REAL TIME MOTION CAPTURE, which is hereby incorporated by reference in its entirety. The computer processing system may run on a CELL™ processor.

Figure 5:
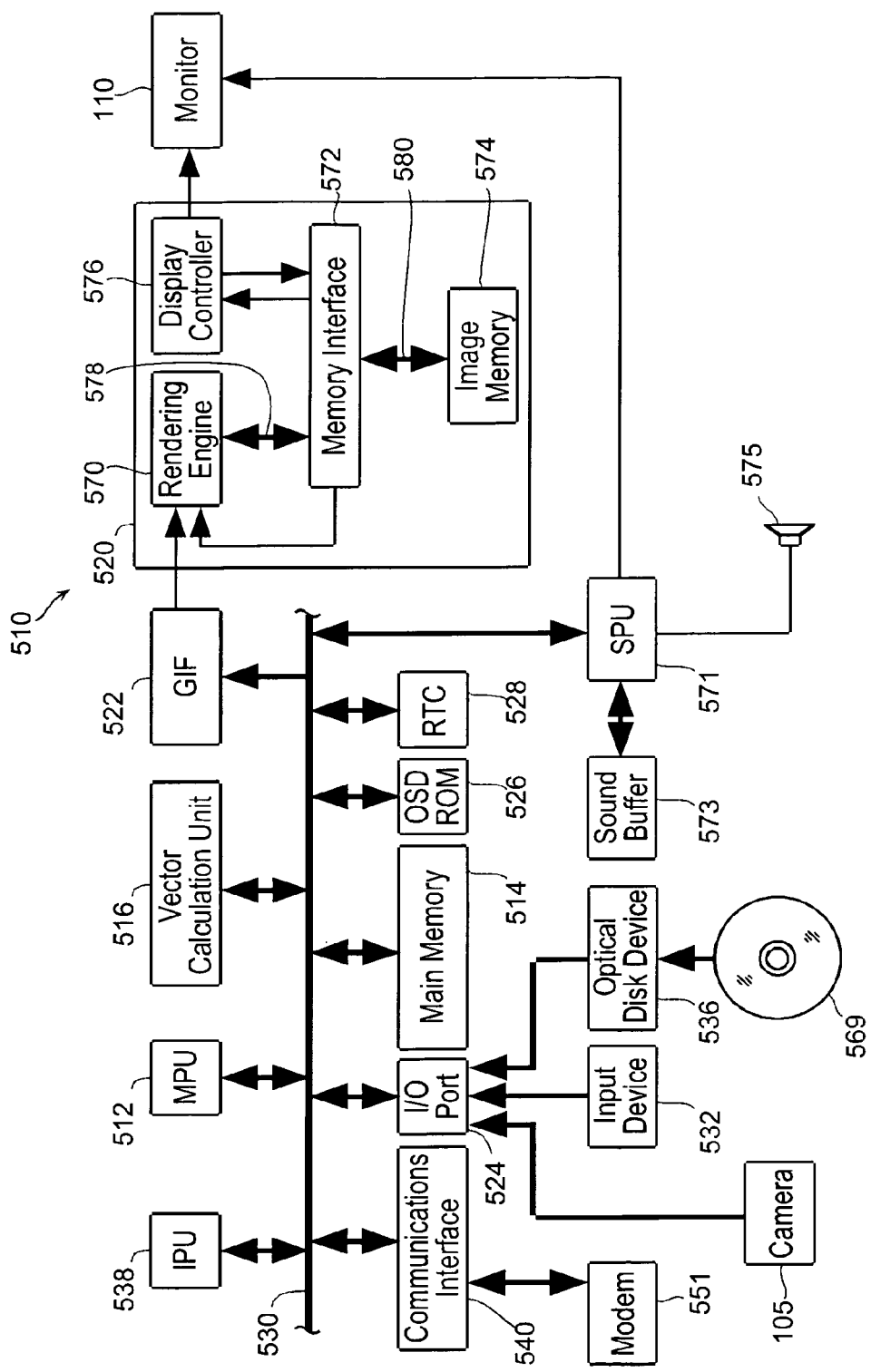
FIG. 5 is a block diagram of a configuration of the components of a video game console adapted for use with a manipulated object serving as an alternative input device.

FIG. 5 is a block diagram of a configuration of the components of a video game console adapted for use with a manipulated object serving as an alternative input device in accordance with one embodiment of the invention. Exemplary game console 510 is equipped by a multiprocessor unit (MPU) 512 for control of overall console 510, main memory 514 which is used for various program operations and for storage of data, vector calculation unit 516 for performing floating point vector calculations necessary for geometry processing, image processor 520 for generating data based on controls from MPU 512, and for outputting video signals to monitor 110 (for example a CRT), a graphics interface (GIF) 522 for carrying out mediation and the like over a transmission bus between MPU 512 or vector calculation unit 516 and image processor 520, input/output port 524 for facilitating reception and transmission of a data to and from peripheral devices, internal OSD functional ROM (OSDROM) 526 constituted by, for example, a flash memory, for performing control of a kernel or the like, and real time clock 528 having calendar and timer functions.

Main memory 514, vector calculation unit 516, GIF 522, OSDROM 526, real time clock (RTC) 528 and input/output port 524 are connected to MPU 512 over data bus 530. Also connected to BUS 530 is image processing unit 538 which is a processor for expanding compressed moving images and texture images, thereby developing the image data. For example, the image processing unit 538 can serve functions for decoding and development of bit streams according to the MPEG2 or MPEG4 standard formats, macroblock decoding, performing inverse discrete cosine transformations, color space conversion, vector quantization and the like.

A sound system is constituted by sound processing unit SPU 571 for generating musical or other sound effects on the basis of instructions from MPU 512, sound buffer 573 into which waveform data may be recorded by SPU 571, and speaker 575 for outputting the musical or other sound effects generated by SPU 571. It should be understood that speaker 575 may be incorporated as part of monitor 110 or may be provided as a separate audio line-out connection attached to external speaker 575.

Communications interface 540 is also provided, connected to BUS 530, which is an interface having functions of input/output of digital data, and for input of digital contents according to the present invention. For example, through communications interface 540, user input data may be transmitted to, and status data received from, a server terminal on a network in order to accommodate on-line video gaming applications. Input device 532 (also known as a controller) for input of data (e.g. key input data or coordinate data) with respect to the console 510 optical disk device 536 for reproduction of the contents of optical disk 569, for example a CD-ROM or the like on which various programs and data (i.e. data concerning objects, texture data and the like), are connected to input/output port 524.

The present invention further includes digital video camera 105 which is connected to input/output port 524. Input/output port 524 may be embodied by one or more input interfaces, including serial and USB interfaces, wherein digital video camera 190 may advantageously make use of the USB input or any other conventional interface appropriate for use with camera 105.

The above-mentioned image processor 520 includes a rendering engine 570, interface 572, image memory 574 and a display control device 576 (e.g. a programmable CRT controller, or the like). The rendering engine 570 executes operations for rendering of predetermined image data in the image memory, through memory interface 572, and in correspondence with rendering commands which are supplied from MPU 512. The rendering engine 570 has the capability of rendering, in real time, image data of 320×240 pixels or 640×480 pixels, conforming to, for example, NTSC or PAL standards, and more specifically, at a rate greater than ten to several tens of times per interval of from 1/60 to 1/30 of a second.

BUS 578 is connected between memory interface 572 and the rendering engine 570, and a second BUS 580 is connected between memory interface 572 and the image memory 574. First BUS 578 and second BUS 580, respectively, have a bit width of, for example 128 bits, and the rendering engine 570 is capable of executing high speed rendering processing with respect to the image memory. Image memory 574 employs a unified memory structure in which, for example, a texture rendering region and a display rendering region, can be set in a uniform area.

Display controller 576 is structured so as to write the texture data which has been retrieved from optical disk 569 through optical disk device 536, or texture data which has been created on main memory 514, to the texture rendering region of image memory 574, via memory interface 572. Image data which has been rendered in the display rendering region of image memory 174 is read out via memory interface 572, outputting the same to monitor 110 whereby it is displayed on a screen thereof.

Figure 6:
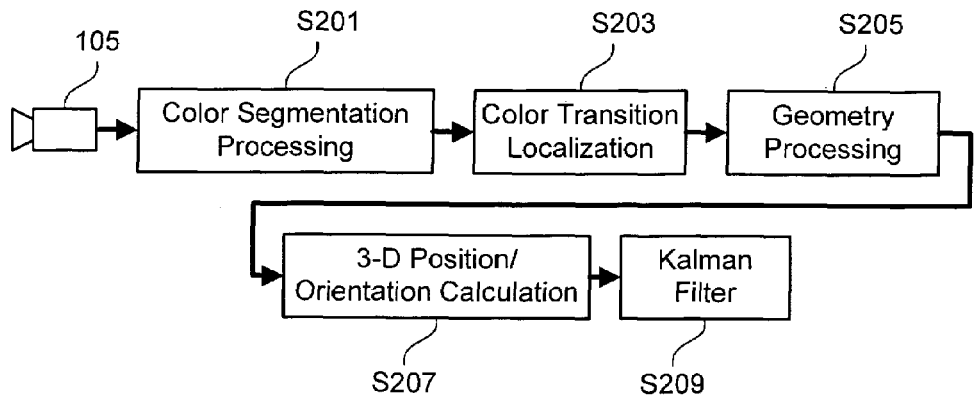
FIG. 6 is a block diagram showing the functional blocks used to track and discriminate a pixel group corresponding to the user input device as it is being manipulated by the user.

FIG. 6 is a block diagram showing the functional blocks used to track and discriminate a pixel group corresponding to the user input device as it is being manipulated by the user in accordance with one embodiment of the invention. It should be understood that the functions depicted by the blocks are implemented by software which is executed by the MPU 512 in game console 510 of FIG. 5. Moreover, not all of the functions indicted by the blocks in FIG. 6 are used for each embodiment.

Initially, the pixel data input from the camera is supplied to game console 510 through input/output port interface 524, enabling the following processes to be performed thereon. First, as each pixel of the image is sampled, for example, on a raster basis, a color segmentation processing step S201 is performed, whereby the color of each pixel is determined and the image is divided into various two-dimensional segments of different colors. Next, for certain embodiments, a color transition localization step S203 is performed, whereby regions where segments of different colors adjoin are more specifically determined, thereby defining the locations of the image in which distinct color transitions occur. Then, a step for geometry processing S205 is performed which, depending on the embodiment, comprises either an edge detection process or performing calculations for area statistics, to thereby define in algebraic or geometric terms the lines, curves and/or polygons corresponding to the edges of the object of interest.

The three-dimensional position and orientation of the object are calculated in step S207, according to algorithms which are to be described in association with the subsequent descriptions of preferred embodiments of the present invention. The data of three-dimensional position and orientation also undergoes a processing step S209 for Kalman filtering to improve performance. Such processing is performed to estimate where the object is going to be at a point in time, and to reject spurious measurements that could not be possible, and therefore are considered to lie outside the true data set. Another reason for Kalman filtering is that the camera 105 may produce images at 30 Hz, whereas an example display runs at 60 Hz, so Kalman filtering may fill the gaps in the data used for controlling action in the game program. Smoothing of discrete data via Kalman filtering is well known in the field of computer vision and hence will not be elaborated on further.

Figure 7:
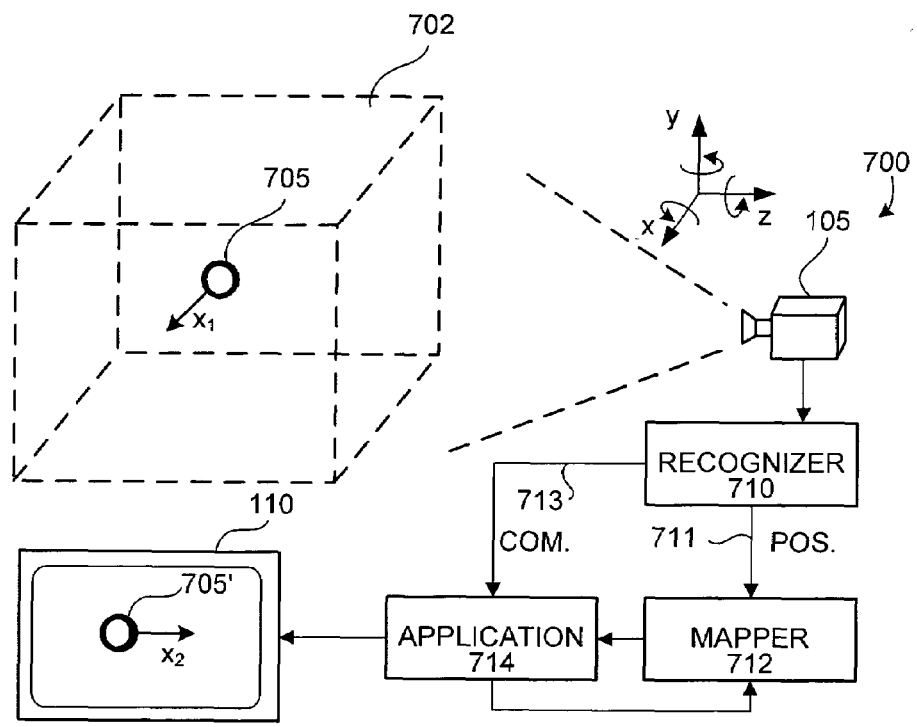
FIG. 7 shows a schematic block diagram for an exemplary image processing system.

FIG. 7 shows a schematic block diagram for an exemplary image processing system 700 for mapping movements of an object 705 a volume of space 702 viewed by an image capture device 105. In this example, as object 705 is moved a distance $x_1$ in three dimensional space 702, image processing system 700 interprets captured video images of object 705, identifies the motion of object 705, and generates a substantially corresponding action on display screen 110.

Specifically, image capture device 105 includes a digital image sensor for generating image data representing an image formed light impacting the sensor after passing through a lens as is generally known in the art. It is also possible that image capture device 105 comprises an analog video camera generating an analog signal representing the image formed by light. In the latter case, the analog signal is converted to a digital representation of the image prior to processing by recognizer 710. Image data representing successive two dimensional images of the three dimensional space 702 is passed to recognizer 710. Recognizer 710 may, in one embodiment, perform various processing steps as described above with reference to FIG. 6 for identifying object 705. The position of object 705 is passed to mapper 712. For example, absolute coordinates of object 705 in three dimensional space 702 may be calculated and transmitted to mapper 712. Coordinates along the x and y axes may be determinable from the position of object as represented in each image. The coordinate of object 705 along the z-axis may be inferred from the size of the object. That is, the closer object 705 is to image capture device 105, the larger it will appear in the image. Thus, a measurement such as the diameter of the object as it appears in the image can be used to calculate distance from image capture device 105, and thus, the z-axis coordinate.

In addition to position information, recognizer 710 may identify commands received from object 705. Commands can be interpreted from transmissions/deformation, sound and light generation etc., of object 705, for example, as described in related U.S. patent application Ser. No. 10/207,677, filed Jul. 27, 2002, entitled "MAN-MACHINE INTERFACE USING A DEFORMABLE DEVICE"; U.S. patent application Ser. No. 10/650,409, Filed Aug. 27, 2003, entitled "AUDIO INPUT SYSTEM"; and U.S. patent application Ser. No. 10/759,782, filed Jan. 16, 2004 entitled "METHOD AND APPARATUS FOR LIGHT INPUT DEVICE", the above listed patent applications being incorporated herein by reference in their entireties. Commands received from object 705 is interpreted by recognizer and data corresponding to the received commands may be communicated to application 714. Application 714 may be a game application or other computer application that requested or is otherwise receptive to user input from image capture device 105. In one embodiment, mapper 712 may input absolute coordinates from recognizer 710 and maps these coordinates to output coordinates that are scaled in accordance with a gearing amount. In another embodiment, mapper 712 receives successive coordinate information from recognizer 710 and converts the changes in coordinate information to vector movements of object 705. For example, if object 705 moves a distance $x_1$ from time $t_1$ to time $t_2$, then a vector $x_1,0,0$ may be generated and passed to application 714. Time $t_1$ to time $t_2$ may be the interval of time between successive frames of the video generated by image capture device 105. Mapper 712 may scale the vector according to a scaling algorithm, e.g., by multiplying the vector by a gearing amount, G. In a different embodiment, each coordinate is multiplied by a corresponding gearing factor, e.g., $G_x$, $G_y$, and $G_z$. Thus, a corresponding motion of virtual object 705' as shown in display 110, may be a distance $X_2$, which is different from $x_1$.

Application 714 may vary the gearing amount in accordance with commands 713 received from recognizer 710, or in accordance with the normal operation of the software, which may send mapper 712 gearing data causing the gearing amount to change. Gearing data may be sent to mapper 712 in response to a user command, various events, or modes of operation of application 714. Thus, the gearing amount may by varied in real time in response to user commands or as controlled by software. Mapper 712 may therefore transmit an output vector of the motion of object 705 to application 714, the output varying in relation to change in position of object 705 in space 702, and the gearing amount. Application 714, which in one embodiment is a video game, translates the output vector into a corresponding action which may then be displayed on display 110.

Figure 8:
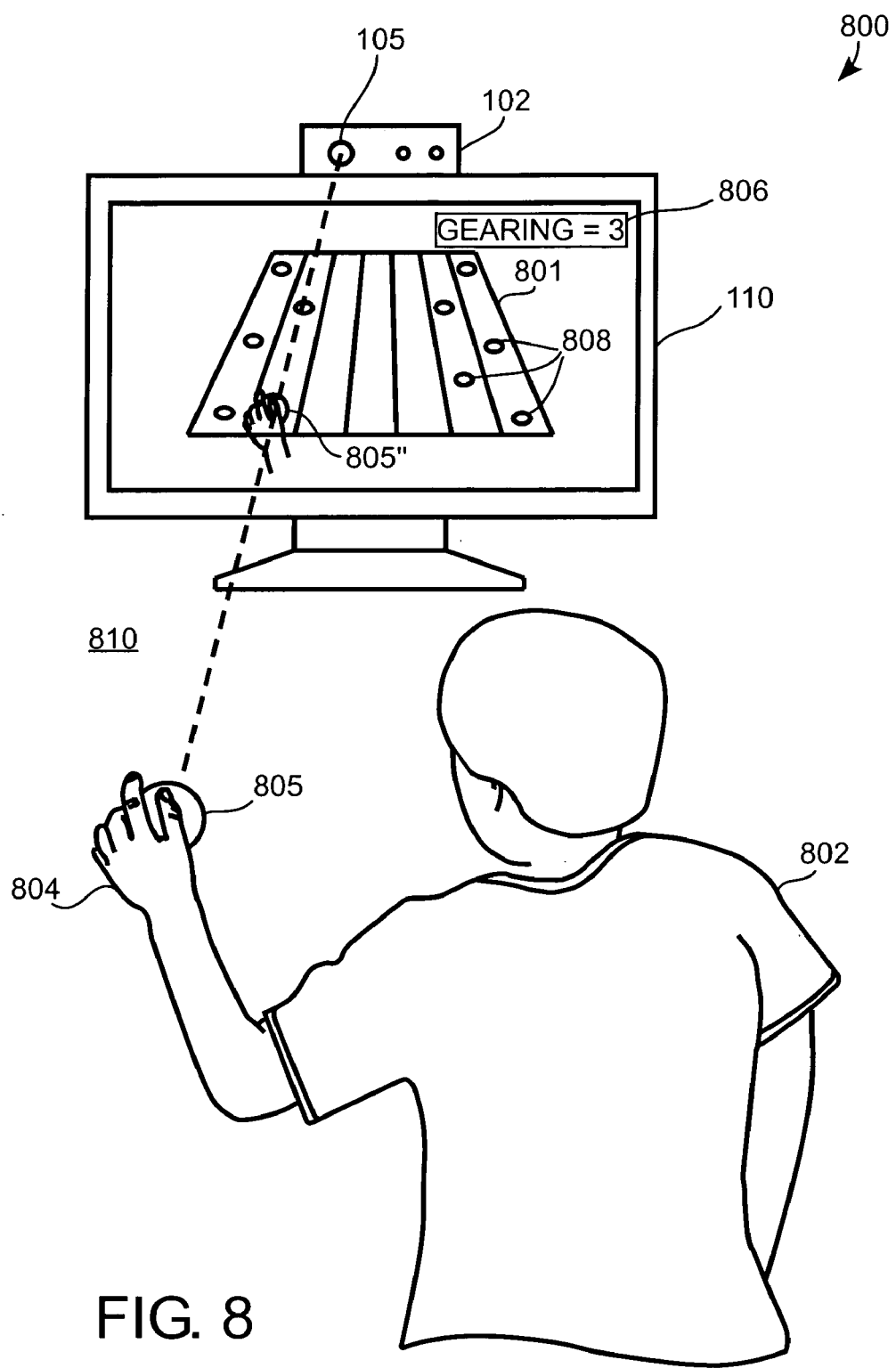
FIG. 8 illustrates an exemplary application for image processing system of FIG. 7.

FIG. 8 illustrates an exemplary application for image processing system 700 of FIG. 7. Computer system 102 includes an image capture device 105 which views scene 810. Scene 810 includes a user 802 holding an object 804 which is recognized by recognizer 710 (FIG. 7). The application program, which in this example is a checkers game, recognizes a command issuing from object 804 to pick up or drop checkers 808 on checkerboard 801. As user moves object 805 before image capture device 105, computer 102 processes images to identify motion of object 804 and translates that motion into motion of virtual object 805' on display 110. The distance virtual object 805' moves in relation to real object 805 depends on gearing amount 806. In this example, gearing amount is represented as "3" on display 110. In one embodiment, the gearing amount is user selectable. The larger the gearing amount, the smaller the movements of real object 805 is required to effectuate a particular distance move of checker 805' on the display 110.

FIGS. 9 and 10 show an exemplary controller 900 that interacts with an image capture device 105 (FIG. 1). Controller 900 includes an interface 902 containing a plurality of interface devices including various buttons and joysticks. The controllers discussed herein can be either wired or wireless. Technologies, such as WiFi, Bluetooth™, IR, sound, and lights may work to interface with a computer, such as a game console. In one embodiment, controller 900 has an LED array 905. The LED array may be configured in various layouts, including a 2×2 stack where each LEDs may be positioned at a vertex of an imaginary rectangular or square-shaped binding box. By tracking the position and deformation of the binding box as it is projected onto the image plane produced by an image capture device, the transformation and deformations may be analyzed in a video analyzer to decipher position and orientation information of the controller.

LED array 905 may generate infrared or visible light. Image capture device 105 (FIG. 1) can identify LED array 905 as described above with reference to various other inventive embodiments. Each controller can be designated as Player 1 through, for example, Player 4, using switch 910, which allows a user selection of player number 1-4, or any number of players. Each player number selection corresponds to a unique pattern or modulation of LEDs being illuminated by LED array 905. For example, for Player 1, 1st, 3rd, and 5th LEDs are illuminated. Such player information may be encoded and transmitted in a repeated fashion over time across multiple video frames. It may be desirable to engage in an interleave scheme so the controller or device LEDS can switch between a tracking mode and a transmission mode. In the tracking mode, all LEDs may be turned on during a first portion of a cycle. In the transmission mode, information may be modulated by the LEDs during a second portion of a cycle. Over time, the LEDS transmit tracking and communications information to a video analyzer or suitable device capable of receiving the signal. In the transmission mode, the LEDs may encode information representative of the player I.D. The period and duty cycle may be chosen to accommodate speed of tracking, lighting conditions, number of controllers, etc. By interleaving communications and tracking information, a video capture device may be supplied with adequate information to compute tracking parameters for each controller and to discriminate between controllers. Such discrimination may be used in a video analyzer to isolate each physical controller when monitoring and tracking the position and orientation and other metrics of the controller movement.

In the transmission mode, other information, including commands or state information may be transmitted by the controller or device LEDs and according to known encoding and modulation schemes. On the receiver side, a video analyzer coupled to the video capture device may sync with and track the state of the LEDS and decode the information and controller movements. It is known that higher bandwidth may be achieved by modulating data across frames in the transmission mode cycle.

User interaction with interface 902 may cause one or more of LEDs in LED array 905 to modulate and/or change color. For example, as a user moves a joystick LEDs may change brightness or transmit information. The changes in intensity or color can be monitored by the computer system and provided to a gaming program as an intensity value. Furthermore, each button may be mapped to a change in color or intensity of one or more of the LEDs in LED array 905.

As controller 900 is moved about in three-dimensional space and rotated in one of a roll, yaw, or pitch direction, image capture device 105 in conjunction with computer system 102 may be capable of identifying these changes and generating a two dimensional vector, for describing movement on the image plane, or a three dimensional vector, for describing movement in three dimensional space. The vector can be provided as a series of coordinates describing relative movement and/or an absolute position with respect to the image capture device 105. As would be evident to those skilled in the art, movement on a plane perpendicular to the line of sight of image capture device 105 (the image plane) can be identified by an absolute position within the image capture zone, while movement of controller closer to image capture device 105 can be identified by the LED array appearing to spread out.

The rectangular configuration of LEDs 905 allow movement of controller 900 on three axes and rotation about each axis to be detected. Although only four LEDs are shown, it should be recognized that this is for exemplary purposes only, and any number of LEDs in any configuration would be possible. As controller 900 is pitched forward or backward, the top and bottom LEDs will get closer to each other while the left and right LEDs remain the same distance apart. Likewise, as the controller yaws left or right, the left and right LEDs will appear to approach each other while the top and bottom LEDs remain the same distance apart. Rolling motion of the controller can be detected by identifying the orientation of the LEDs on the image plane. As the controller moves closer to image capture device 105 along the line of sight thereof, all the LEDs will appear to be closer to each other. Finally, the controller's movement along the image plane can be tracked by identifying the location of the LEDs on the image plane, thereby identifying movement along respective x and y axes.

Controller 900 may also include a speaker 915 for generating audible or ultrasonic sound. Speaker 915 may generate sound effects for increased interactivity, or can transmit commands issued from interface 902 to a computer system having a microphone or other elements for receiving the transmissions.

FIG. 11 shows an exemplary application for controller 900 of FIGS. 9 and 10. In this application, a driving simulation interprets rotation of controller 900 as a rotation of a steering wheel of a virtual automobile. As a user (not shown) rotates controller 900 as shown by arrows 1105, a virtual steering wheel 900' is rotated on display 110 as shown by arrow 1105'. In one embodiment, the gearing amount which dictates the amount of rotation of steering wheel 900' for each degree of rotation of controller 900 is user selectable as described above with reference to FIG. 8. In another embodiment, the gearing amount is software controlled as represented in example graph 1200 shown in FIG. 12. In this example, the gearing amount is varied in relation to the distance from center, i.e., a vertical orientation, of controller 900. This could allow for a full 540° rotation of virtual steering wheel 900' with only a 90° rotation of controller 900. By maintaining a low gearing amount at positions near 0° (center), a high degree of control can be maintained for high speed driving, which generally does not require significant steering rotation. As the controller 900 is rotated farther from the center position, the gearing amount is increased as shown in graph 1200 to accommodate sharper turns as generally required at slower speeds.

FIG. 13 shows another exemplary controller 1300 having a steering wheel 1305 which may be manipulated by a user. In this case, rotations of steering wheel 1305 and actuation of buttons of interface 1302 are interpreted by controller 1300, which generates data transmissions via LEDs 1310.

FIG. 14 shows an exemplary application of controller 1300. In this example, the application is a driving simulation that receives commands issued in response to rotation of steering wheel 1305 and translates these commands as corresponding rotations of a virtual steering wheel 1305 in display 110. A gearing amount, which scales the rotation of steering wheel 1305 to a corresponding rotation of virtual steering wheel 1305' can be changed in response to user interaction with interface 1302 (FIG. 13) or in response to the software control. FIG. 15 shows an exemplary graph 1500 depicting exemplary changes in gearing amount over time. In one example, the changes in gearing can by dynamically set by the user during game play. Additionally, as shown by graph 1500, the transitions in gearing can be smooth, sharp, in steps, for longer time, shorter time, or combinations thereof. Thus, the gearing can be set or changed by the game over time during a gaming session, so as to provide a more realistic interactive experience. Additionally giving the user control of the gearing enables another dimension of control beyond predefined controls found in traditional games.

Figure 16:
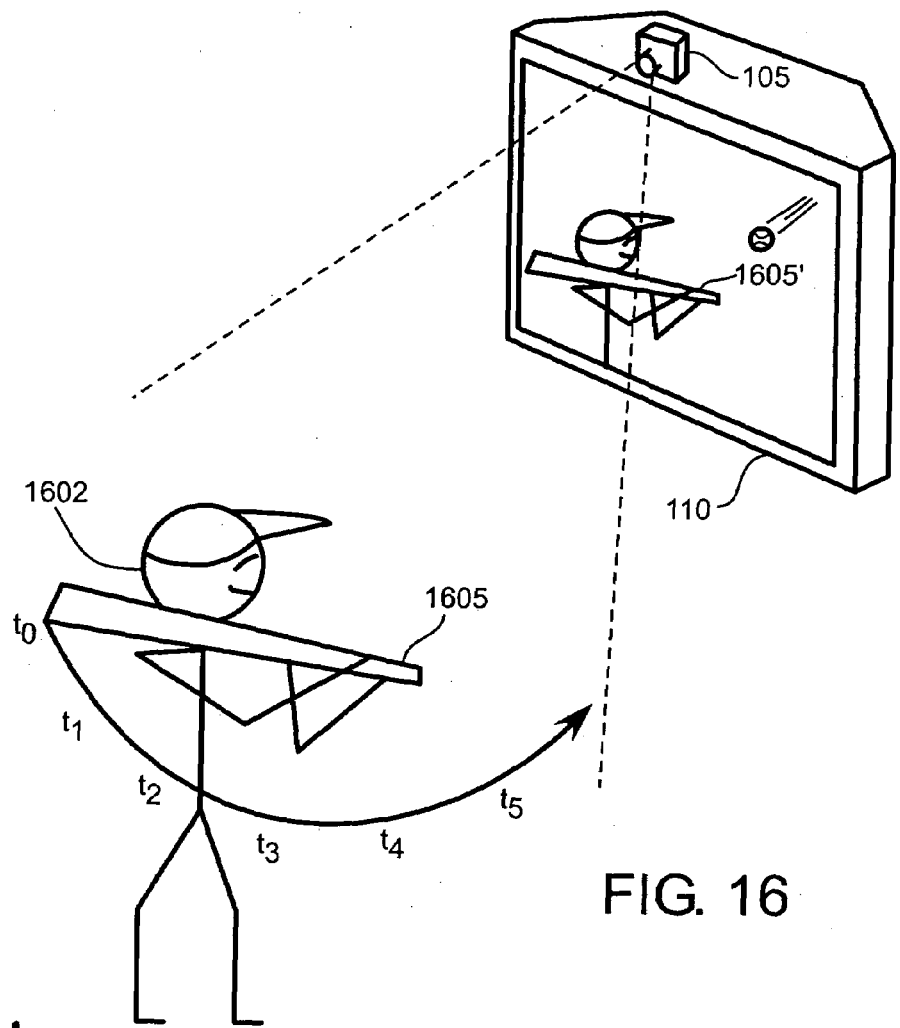
FIG. 16 shows another exemplary application of an image processing system responding to user interaction.

FIG. 16 shows another exemplary application of an image processing system responding to user interaction. In this example, a user 1602 interacts with a baseball simulation by swinging a toy baseball bat 1605 which may be recognized by the image processing system as an input object. As the toy baseball bat is swung the user and/or the software can control the gearing amount to manipulate the speed or distance of virtual baseball bat 1605'. In one embodiment, the bat may include a number of buttons that can be pressed during game play, and by pressing the buttons, the gearing can be made to change. In another embodiment, the user can preset or program in a combination of gearing levels that will be applied when the bat is swung.

Figure 17:
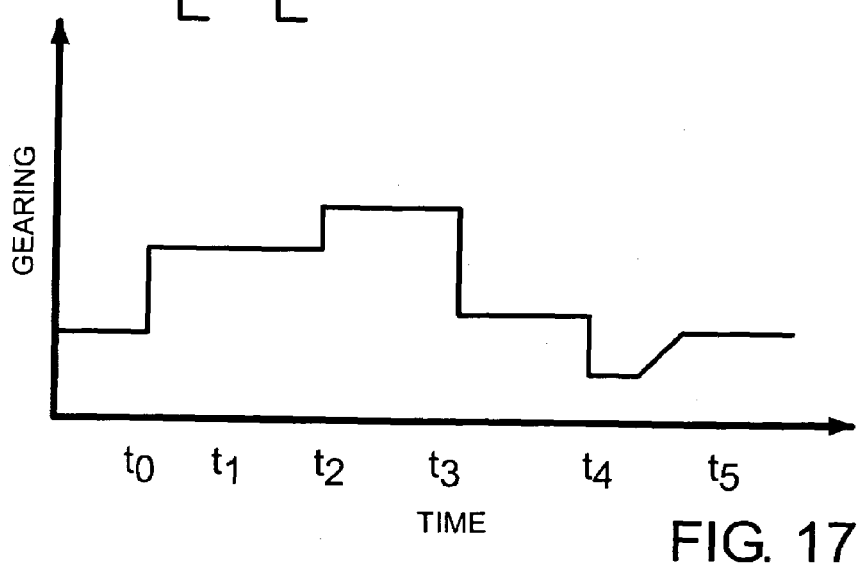
FIG. 17 shows a graph depicting an exemplary gearing amount at different times along the length of a baseball bat swing for the application shown in FIG. 16.

FIG. 17 shows graph 1700 depicting an exemplary gearing amount at different times t1-t5 along the length of the swing. These gearing amounts may have been set by the user before swinging the bat or may have been set by the game dynamically in response to the position of the bat as viewed by the camera 105. Again, it is shown how the gearing can be changed over time, kept constant over particular intervals, or gradually increased. In graph 1700, the gearing may have been set higher between times t2-t3, so that the swing of the bat will be more powerful when contact is made with the ball, and then the gearing is relaxed during time t3-t4 when the bat has already made contact. The different times, in one embodiment, can be estimated by the user, or determined by the computer.

In one example, the user can take a few practice swings, and then the computer can map out a number of example time slots corresponding to the user's actual swing ability. Then, the user can custom assign specific gearing to each time interval, depending on how the user wants to impact his game interactivity. Once the gearing is set, the user's movement of the bat 1605 can then be mapped to the movement of the bat 1605' (e.g., game object). Again, it should be noted that the gearing can be preset by the game during different action, set during game play by the user, and may be adjusted in real time during game play.

Figure 18:
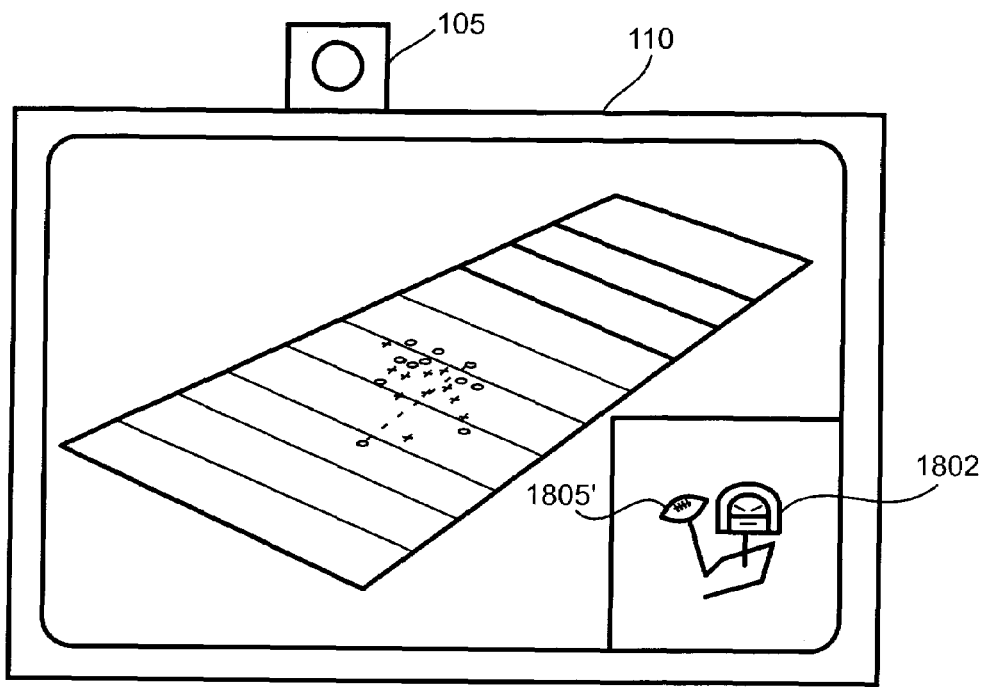
FIG. 18 shows another exemplary application of an image processing system responding to user interaction.

FIG. 18 shows another exemplary application of an image processing system responding to user interaction. In this example, a user (not shown) interacts with a football simulation by making a throwing motion with a toy football, and pressing an actuator to indicate release of the football. Of course, instead of the toy football, a controller may also be used. A virtual player 1802 manipulates a virtual football 1805 in response to user interaction. In one embodiment, the actuator causes an LED to illuminate or change color which is recognized by the image processing system as a command which is sent to the football simulation application. After releasing the ball, the user is able to control certain action on the field, such as the motion of a selected receiver. In one embodiment, the release of the ball triggers the application to send gearing data to the mapper (FIG. 7) to change the gearing amount, e.g., to allow for discriminating finer movements of the input object.

Figure 19:
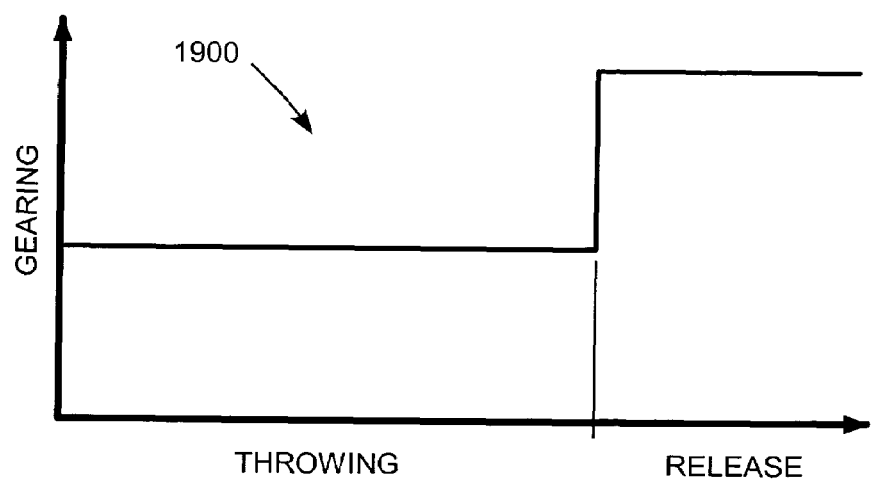
FIG. 19 shows a graph illustrating an exemplary change in gearing amount upon "releasing" a football for the application shown in FIG. 18.

FIG. 19 shows an exemplary graph 1900 illustrating the change in gearing amount upon "releasing" the football. Although shown as a simple graph 1900, it should be understood that the gearing can take on any profile, depending on the game object.

Figure 20:
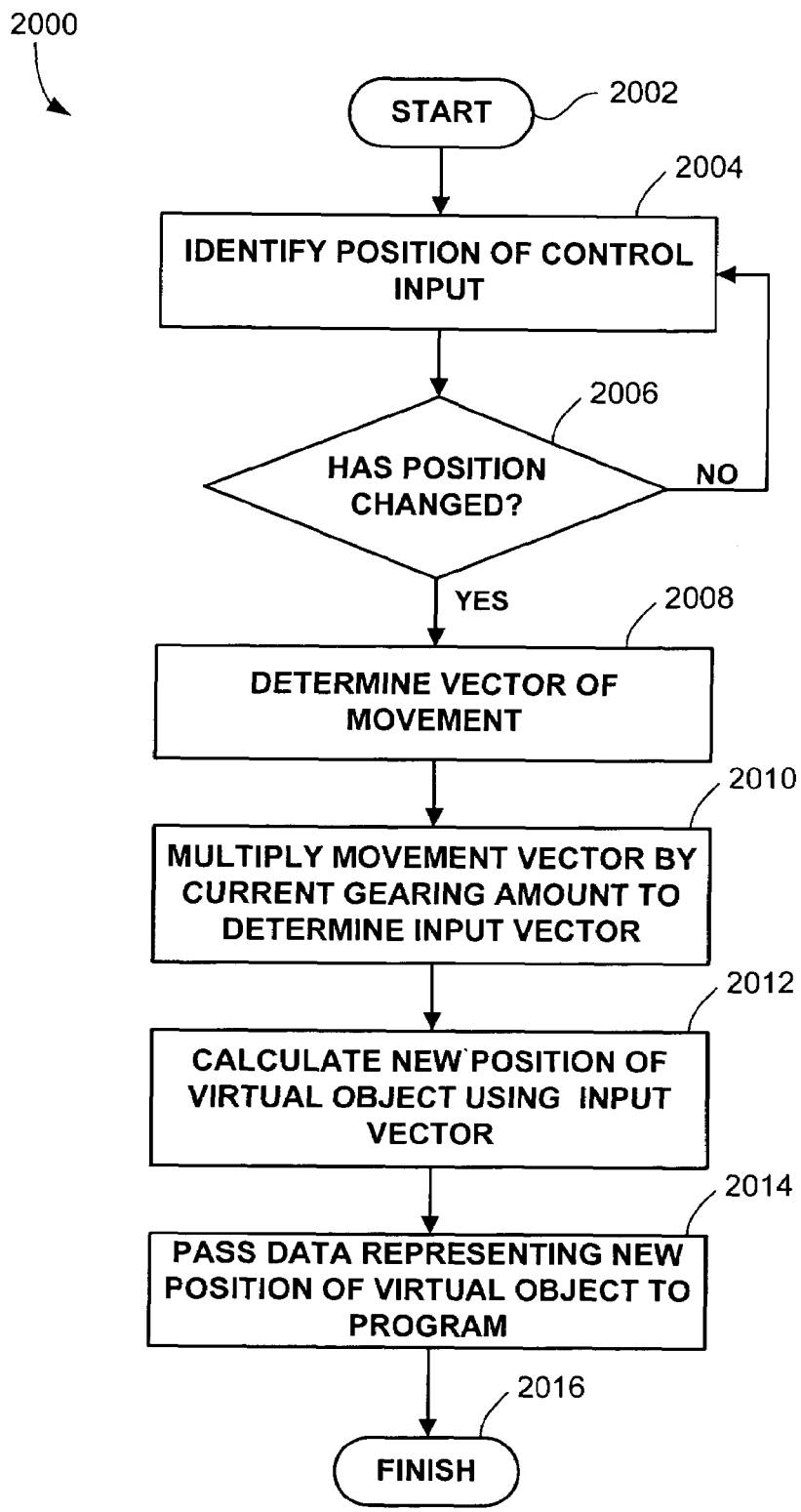
FIG. 20 shows a flowchart describing an exemplary procedure for receiving user input to computer program.

FIG. 20 shows a flowchart 2000 describing an exemplary procedure for receiving user input for the computer program. The procedure begins as indicated by start block 2002 and proceeds to operation 2004 wherein a position of a control input is identified. The control input may be the position of an input object in a three dimensional space as described above with reference to FIG. 7, or the position of a user interface device as described above with reference to FIG. 14. The position may be expressed as a representative value, or a plurality of values, such as a vector. After identifying the position of the control input, the procedure flows to operation 2006.

In operation 2006, a determination is made as to whether the position has changed. If the position has not changed, then the procedure returns to operation 2004. In one embodiment, operation 2004 is delayed until a new frame of image data is received from the image capture device. If, at operation 2006, it is determined that the position has changed, then the procedure flows to operation 2008.

In operation 2008, a vector of movement is calculated. The movement vector can be any number of dimensions. For example, if the movement is of an input object in three-dimensional space, the movement vector may describe the movement as a three dimensional vector. However, if the movement is of a one dimensional control input, such as a steering wheel, then the movement vector is a one dimensional vector that describes the amount of rotation of the steering wheel. After determining the movement vector the procedure flows to operation 2010.

In operation 2010, the movement vector is multiplied by a current gearing amount to determine an input vector. The current gearing amount may be a scalar quantity or a multidimensional value. If it is a scalar quantity, then all dimensions of the movement vector are multiplied by the same amount. If the gearing amount is multidimensional, then each dimension of the movement vector is multiplied by a corresponding dimension of the gearing amount. The gearing amount may vary in response to user input and may be under software control. Therefore, the current gearing amount may change from moment to moment. After multiplying the movement vector by the current gearing amount, the procedure flows to operation 2012.

In operation 2012, a new position of a virtual object is calculated using the input vector calculated in operation 2010. The new position may be a camera position, or an object position such as a virtual steering wheel. The virtual object may not be displayed on a display screen. Once the new position of the virtual object is calculated, the procedure flows to operation 2014 wherein data representing the new position is passed to the application program. The procedure then ends as indicated by finish block 2016. It should be noted, however, that this flow is only exemplary in nature, and other alternatives may be possible.

In one embodiment, the operations will include the detection of an input device and the movement of the input device. The movement of the input device is determined by a camera that is viewing the input device. By user control or preset or pre-programmed settings, a gearing value is applied. If set by the user, the gearing value can be selected, for example, by allowing the user to hit a button on the input device (e.g., a controller). Depending on the gearing amount, movement control is mapped to an object of a computer game. If the user is using the input device to control an action figure on of a game, then the gearing that is set or controlled to be set will affect how the movement by the input device is mapped to the movement by the action figure of the computer game. Therefore, the gearing and the changes in gearing allow for the dynamic application of a mapped response by the object that may be part of a computer game.

In various embodiments, the image processing functions described above for determining the intensity value, controller player number, orientation and/or position of one or more input objects including controllers is carried out in a process executing on a computer system. The computing system is also executing a main process, referred to herein as an application program, which may be a gaming application, that requests or is otherwise receptive to the data generated from the image or audio processing, such data comprising controller player number, orientation and/or position of one or more input objects including controllers, controller actuation, etc. In various embodiments, the process performing the image and/or audio processing functions is a driver for a video camera or video/audio monitoring device, the driver providing the data to the main process via any type of inter-process communication which may be implementation specific as generally known and understood in the art. The process performing image or audio processing executes on the same processor or a different processor as the one executing the main process which is the gaming software or other application program. It is also possible to have a common process for both image or audio processing and game functionality in the same process, e.g., using a procedure call. Therefore, while it may be stated herein that the input vector or other information is provided "to the program" it should be recognized that the invention encompasses providing such data to one routine of a process using a procedure call or other software function such that a single process can both perform image processing functionality as well as gaming functionality, as well as separating the functions into different processes whereby one or more processes, which may execute on a common processor core or multiple processor cores, perform image and/or audio processing as described herein and a separate process performs gaming functions.

The present invention may be used as presented herein or in combination with other user input mechanisms and notwithstanding mechanisms that track the angular direction of the sound and/or mechanisms that track the position of the object actively or passively, mechanisms using machine vision, combinations thereof and where the object tracked may include ancillary controls or buttons that manipulate feedback to the system and where such feedback may include but is not limited light emission from light sources, sound distortion means, or other suitable transmitters and modulators as well as buttons, pressure pad, etc. that may influence the transmission or modulation of the same, encode state, and/or transmit commands from or to the device being tracked.

The invention may be practiced with other computer system configurations including game consoles, gaming computers or computing devices, hand-held devices, microprocessor systems, microprocessor-based or programmable consumer electronics, minicomputers, mainframe computers and the like. The invention may also be practiced in distributing computing environments where tasks are performed by remote processing devices that are linked through a network. For instance, on-line gaming systems and software may also be used.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, FLASH based memory, CD-ROMs, CD-Rs, CD-RWs, DVDs, magnetic tapes, and other optical and non-optical data storage devices. The computer readable medium can also be distributed over a network coupled computer systems so that the computer readable code is stored and executed in a distributed fashion.

Still further, although gearing has been discussed in relation to video games, it should be understood that the gearing can be applied to any computer controlled environment. In one example, the gearing can be associated with a computer input device that allows for the interaction, selection, or input of information. Applying different gearing during different input or interactive operations can enable further degrees of operation not normally found in environments that have pre-configured control settings. Accordingly, the embodiments of gearing, as defined herein, should be given a broad encompassing application.

Once the gearing is determined, the gearing can be applied to a gesture, that may be communicated to a computer program. As noted above, tracking of a gesture or input device can be accomplished via image analysis, inertial analysis, or audible analysis. Examples of gestures include, but are not limited to throwing an object such as a ball, swinging an object such as a bat or golf club, pumping a hand pump, opening or closing a door or window, turning steering wheel or other vehicle control, martial arts moves such as punches, sanding movements, wax-on wax-off, paint the house, shakes, rattles, rolls, football pitches, baseball pitches, turning knob movements, 3D/2D MOUSE movements, scrolling movements, movements with known profiles, any recordable movement, movements along any vector back and forth i.e. pump the tire but at some arbitrary orientation in space, movements along a path, movements having precise stop and start times, any time based user manipulation that can be recorded, tracked and repeated within the noise floor, splines, and the like. Each of these gestures may be pre-recorded from path data and stored as a time-based model. The gearing, therefore, can be applied on any one of these gestures, depending the degree of gearing set by the user or program.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for interactive interfacing with a computer gaming system, comprising:
providing an input device, the input device conveying inertial data that is to be interpreted by the computer gaming system;
identifying an action to be performed by the computer gaming system, the action being mapped to the inertial data provided by the input device; and
applying a gearing between the action to be performed by the computer gaming system and the inertial data received from the input device;
wherein the gearing scales an adjustment to impact the action to be performed by the computer gaming system and the gearing is dynamically adjustable based on user settings, or is defined for dynamic adjustment over time by a program executed by the computer gaming system.

2. A method for interactive interfacing with a computer gaming system as recited in claim 1, wherein the action includes one of, (a) setting for an amount of movement by an object of a computer game as executed by the computer gaming system, (b) setting a variable for executing a process, (c) setting a rate of change to a process that then affects a sound or vibration, or (d) setting a rate of change in movement of a graphical object.

3. A method for interactive interfacing with a computer gaming system as recited in claim 1, further comprising,
   at least periodically analyzing the inertial data;
   at least periodically re-applying the action with changes as updated by the gearing.

4. A method for interactive interfacing with a computer gaming system as recited in claim 3, further comprising,
   if it is determined that the gearing has been updated, the updated gearing is applied while resuming processing of the action, before a next action or gradually over time.

5. A method for interactive interfacing with a computer gaming system as recited in claim 3, wherein when the gearing has been adjusted, the adjusted gearing is applied (a) in steps, (b) gradually or (c) smoothly, so as to impact the action.

6. A method for interactive interfacing with a computer gaming system as recited in claim 1, wherein the inertial data is analyzed to identify coordinate information of the input device and the coordinate information is converted by the mapping into vector data that is applied to the action.

7. A method for interactive interfacing with a computer gaming system as recited in claim 6, wherein the vector data is scaled in response to adjustments in the gearing.

8. A method for interactive interfacing with a computer gaming system as recited in claim 6, wherein the vector data is scaled by multiplying the vector data with a gearing amount defined by the gearing.

9. A method for interactive interfacing with a computer gaming system as recited in claim 6, wherein the input device includes a plurality of lights that are to be used to detect a positioning of the input device and communication data.

10. A system for enabling dynamic user interactivity between user actions and actions to be performed by a computer program, comprising:
    a computing system,
    an inertial analyzer being coupled to or executed by the computing system;
    an input device for interfacing with the computer program that is to be executed by the computing system, the input device having a gearing control for establishing a scaling between inertial data produced at the input device and actions to be applied by the computer program as analyzed by the inertial analyzer;
    wherein changes in the gearing control are set before, during or after interactivity with an object of the computer proaram, the changes act to impart a different response by the object from moment-to-moment during execution of the actions to be applied by the computer program.

11. A system for enabling dynamic user interactivity between user actions and actions to be performed by a computer program as recited in claim 10, wherein the computer program is an interactive application.

12. A system for enabling dynamic user interactivity between user actions and actions to be performed by a computer program as recited in claim 11, wherein the interactive application is a video game.

13. A system for enabling dynamic user interactivity between user actions and actions to be performed by a computer program as recited in claim 11, wherein the input device is a controller or a hand-held object.

14. A system for enabling dynamic user interactivity between user actions and actions to be performed by a computer program as recited in claim 13, wherein the controller or hand-held object includes light emitting diodes for detecting position.

15. A system for enabling dynamic user interactivity between user actions and actions to be performed by a computer program as recited in claim 13, wherein the controller or hand-held object includes a speaker for communicating sound or ultrasonic signals to cause the computing system to trigger the action.

16. A system for enabling dynamic user interactivity between user actions and actions to be performed by a computer program as recited in claim 13, wherein the controller or hand-held object includes a microphone for receiving input from a user for communicating with the computing system to trigger an action by the computer program.

17. An apparatus for enabling dynamic user interactivity between user actions and actions to be performed by a computer program, the apparatus comprising:
    an input device for interfacing with the computer program that is to be executed by a computing system, the input device having a gearing control for establishing a scaling between inertial data of the input device as mapped to an action to be applied by the computing system, the gearing control defining a gearing amount that is allowed to dynamically change from moment-to-moment in response changes triggered from buttons on the input device or changes triggered by the computer program before, during or after interactivity with the computer program.

18. A apparatus for enabling dynamic user interactivity between user actions and actions to be performed by an object of a computer program as recited in claim 17, wherein the input device is a controller or hand-held object that includes light emitting diodes for detecting position.

19. A apparatus for enabling dynamic user interactivity between user actions and actions to be performed by an object of a computer program as recited in claim 18, wherein the controller or hand-held object includes a speaker for communicating sound or ultrasonic signals to cause the computing system to trigger an action.

20. A apparatus for enabling dynamic user interactivity between user actions and actions to be performed by an object of a computer program as recited in claim 18, wherein the controller or hand-held object includes a microphone for receiving input from a user for communicating with the computing system to trigger an action by the computer program.

* * * * *

INTER PARTES REEXAMINATION CERTIFICATE (475th)
United States Patent
Zalewski et al.

(10) Number: US 7,352,359 C1
(45) Certificate Issued: Oct. 15, 2012

(54) METHOD AND SYSTEM FOR APPLYING GEARING EFFECTS TO INERTIAL TRACKING

(75) Inventors: Gary M. Zalewski, Foster City, CA (US); Richard Marks, Foster City, CA (US); Xiadong Mao, Foster City, CA (US)

(73) Assignee: Sony Computer Entertainment America LLC, Foster City, CA (US)

Reexamination Request:
No. 95/000,619, Jul. 28, 2011

Reexamination Certificate for:
Patent No.: 7,352,359
Issued: Apr. 1, 2008
Appl. No.: 11/382,041
Filed: May 7, 2006

Related U.S. Application Data

(63) Continuation-in-part of application No. 10/207,677, filed on Jul. 27, 2002, now Pat. No. 7,102,615, and a continuation-in-part of application No. 10/650,409, filed on Aug. 27, 2003, now Pat. No. 7,613,310, and a continuation-in-part of application No. 10/663,236, filed on Sep. 15, 2003, now Pat. No. 7,883,415, and a continuation-in-part of application No. 10/759,782, filed on Jan. 16, 2004, now Pat. No. 7,623,115, and a continuation-in-part of application No. 10/820,469, filed on Apr. 7, 2004, now Pat. No. 7,970,147, and a continuation-in-part of application No. 11/301,673, filed on Dec. 12, 2005, now Pat. No. 7,646,372, and a continuation-in-part of application No. 11/381,729, filed on May 4, 2006, now Pat. No. 7,809,145, and a continuation-in-part of application No. 11/381,728, filed on May 4, 2006, now Pat. No. 7,545,926, and a continuation-in-part of application No. 11/381,725, filed on May 4, 2006, now Pat. No. 7,783,061, and a continuation-in-part of application No. 11/381,727, filed on May 4, 2006, now Pat. No. 7,697,700, and a continuation-in-part of application No. 11/381,724, filed on May 4, 2006, now Pat. No. 8,073,157, and a continuation-in-part of application No. 11/381,721, filed on May 4, 2006.

(60) Provisional application No. 60/718,145, filed on Sep. 15, 2005.

(51) Int. Cl.
*G09G 5/00* (2006.01)
*G06F 3/16* (2006.01)
*G06F 19/00* (2006.01)

(52) U.S. Cl. ........ 345/156; 345/161; 345/163; 345/167; 345/168; 463/30; 463/36; 463/37; 715/716; 715/727

(58) Field of Classification Search ........................ None
See application file for complete search history.

(56) References Cited

To view the complete listing of prior art documents cited during the proceeding for Reexamination Control Number 95/000,619, please refer to the USPTO's public Patent Application Information Retrieval (PAIR) system under the Display References tab.

*Primary Examiner* — Minh Dieu Nguyen

(57) ABSTRACT

Methods and systems for interactive interfacing with a computer gaming system are provided. A method includes providing an input device, where the input device is configured to convey inertial data that is to be interpreted by the computer gaming system. The method then identifies an action to be performed by the computer gaming system, where the action is mapped to the inertial data provided by the input device. Then, the method applies a gearing between the action to be performed by the computer gaming system and the inertial data received from the input device. The gearing scales an adjustment to impact the action to be performed by the computer gaming system. The gearing can be set dynamically by the game, by the user, or can be preset by software or user configured in accordance with a gearing algorithm.

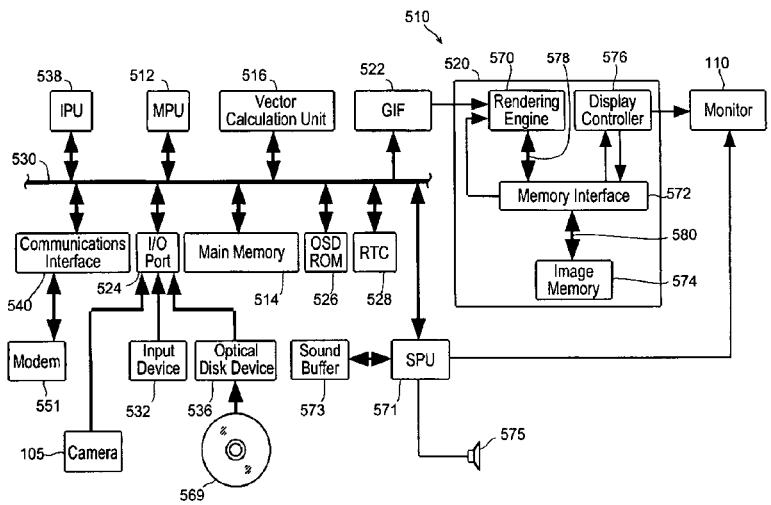

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 10 and 17 are determined to be patentable as amended.

Claims 2-9, 11-16 and 18-20, dependent on an amended claim, are determined to be patentable.

1. A method for interactive interfacing with a computer gaming system, comprising:
   providing an input device, the input device conveying inertial data that is to be interpreted by the computer gaming system;
   *capturing image data of the input device;*
   identifying an action to be performed by the computer gaming system, the action being mapped to the inertial data provided by the input device *and the image data*; and
   applying a gearing between the action to be performed by the computer gaming system and the inertial data received from the input device *and the image data*;
   wherein the gearing scales an adjustment to impact the action to be performed by the computer gaming system and the gearing [is dynamically adjustable based on user settings, or] is defined for dynamic adjustment over time by a program executed by the computer gaming system.

10. A system for enabling dynamic user interactivity between user actions and actions to be performed by a computer program, comprising:
    a computing system,
    an inertial analyzer being coupled to or executed by the computing system;
    *an image analyzer being coupled to or executed by the computing system;*
    an input device for interfacing with the computer program that is to be executed by the computing system, the input device having a gearing control for establishing a scaling between inertial data produced at the input device *and image data captured of the input device,* and actions to be applied by the computer program as analyzed by the inertial analyzer *and the image analyzer, respectively*;
    wherein changes in the gearing are set before, during or after interactivity with an object of the computer program, the changes act to impart a different response by the object *dynamically* from moment-to-moment during execution of the actions to be applied by the computer program.

17. An apparatus for enabling dynamic user interactivity between user actions and actions to be performed by a computer program, the apparatus comprising:
    an input device for interfacing with the computer program that is to be executed by a computing system, the input device having *an inertial sensor for generating inertial data, and a light indicative of position of the input device, the inertial data and the position of the input device enable the computing system to generate* a gearing control for establishing a scaling between *the* inertial data of the input device *and the position of the input device* as mapped to an action to be applied by the computing system, the gearing control defining a gearing amount that is allowed to dynamically change from moment-to-moment in response *to* changes [triggered from buttons on the input device or changes] triggered by the computer program [before,] during [or after] interactivity with the computer program.

* * * * *